US011614735B1

(12) United States Patent
Poeppel et al.

(10) Patent No.: US 11,614,735 B1
(45) Date of Patent: Mar. 28, 2023

(54) SYSTEMS AND METHODS FOR REMOTE STATUS DETECTION OF AUTONOMOUS VEHICLES

(71) Applicant: UATC, LLC, San Francisco, CA (US)

(72) Inventors: Scott C. Poeppel, Pittsburgh, PA (US); Noah Zych, Pittsburgh, PA (US); Matthew Shaw Wood, Pittsburgh, PA (US); Dirk John Vandenberg, III, Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 476 days.

(21) Appl. No.: 16/220,406

(22) Filed: Dec. 14, 2018

Related U.S. Application Data

(60) Provisional application No. 62/673,227, filed on May 18, 2018.

(51) Int. Cl.
*G05D 1/00* (2006.01)
*G08G 1/017* (2006.01)
*G05D 1/02* (2020.01)
*G07C 5/00* (2006.01)

(52) U.S. Cl.
CPC ......... *G05D 1/0022* (2013.01); *G05D 1/0088* (2013.01); *G05D 1/0221* (2013.01); *G07C 5/008* (2013.01); *G08G 1/0175* (2013.01); *G05D 2201/0213* (2013.01)

(58) Field of Classification Search
None
See application file for complete search history.

(56) References Cited

U.S. PATENT DOCUMENTS

| | | | |
|---|---|---|---|
| 2015/0348335 A1* | 12/2015 | Ramanujam | G05D 1/0088 701/23 |
| 2018/0218605 A1* | 8/2018 | Mowatt | G06Q 30/0284 |
| 2019/0049987 A1* | 2/2019 | Djuric | G06K 9/6288 |
| 2019/0064836 A1* | 2/2019 | Buttolo | G06T 11/60 |
| 2019/0204097 A1* | 7/2019 | Stams | G07C 5/0808 |
| 2019/0238638 A1* | 8/2019 | Way | G05D 1/0088 |
| 2019/0258263 A1* | 8/2019 | Wendel | B60R 21/01556 |
| 2021/0001882 A1* | 1/2021 | Mortazavi | G08G 1/096783 |

* cited by examiner

*Primary Examiner* — James M McPherson
*Assistant Examiner* — Bakari Underwood
(74) *Attorney, Agent, or Firm* — Dority & Manning, P.A.

(57) ABSTRACT

Systems and methods are provided for remotely detecting a status associated with an autonomous vehicle and generating control actions in response to such detections. In one example, a computing system can access a third-party communication associated with an autonomous vehicle. The computing system can determine, based at least in part on the third-party communication, a predetermined identifier associated with the autonomous vehicle. The computing system can determine, based at least in part on the third-party communication, a status associated with the autonomous vehicle, and transmit one or more control messages to the autonomous vehicle based at least in part on the predetermined identifier and the status associated with the autonomous vehicle.

19 Claims, 10 Drawing Sheets

SYSTEMS AND METHODS FOR REMOTE STATUS DETECTION OF AUTONOMOUS VEHICLES

RELATED APPLICATION

This application claims priority to and the benefit of U.S. Provisional Patent Application No. 62/673,227, titled "Systems and Methods for Remote Status Detection of Autonomous Vehicles," and filed on May 18, 2018. U.S. Provisional Patent Application No. 62/673,227 is hereby incorporated by reference herein in its entirety.

FIELD

The present disclosure relates generally to improving the ability of remote computing devices to manage autonomous vehicle operations.

BACKGROUND

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path for navigating through such surrounding environment.

SUMMARY

Aspects and advantages of embodiments of the present disclosure will be set forth in part in the following description, or may be learned from the description, or may be learned through practice of the embodiments.

One example aspect of the present disclosure is directed to a computing system. The computing system includes one or more processors and one or more non-transitory computer-readable media that store instructions, that when executed by the one or more processors, cause the one or more processors to perform operations. The operations include accessing a third-party communication associated with an autonomous vehicle. The operations include determining, based at least in part on the third-party communication, a predetermined identifier associated with the autonomous vehicle and a status associated with the autonomous vehicle. The operations include transmitting one or more control messages to the autonomous vehicle based at least in part on the predetermined identifier and the status associated with the autonomous vehicle.

Another example aspect of the present disclosure is directed to one or more tangible, non-transitory computer-readable media storing computer-readable instructions that when executed by one or more processors cause the one or more processors to perform operations. The operations include accessing a third-party communication associated with an autonomous vehicle. The operations include determining, based at least in part on the third-party communication, a predetermined identifier associated with the autonomous vehicle and a status associated with the autonomous vehicle. The operations include transmitting one or more control messages to the autonomous vehicle based at least in part on the predetermined identifier and the status associated with the autonomous vehicle.

Yet another example aspect of the present disclosure is directed to a computer-implemented method that includes accessing, by a computing system comprising one or more computing devices associated with a service entity, a third-party communication associated with an autonomous vehicle. The method includes determining, by the computing system and based at least in part on the third-party communication, a predetermined identifier associated with the autonomous vehicle and a status associated with the autonomous vehicle. The method includes transmitting, by the computing system, one or more control messages to the autonomous vehicle based at least in part on the predetermined identifier and the status associated with the autonomous vehicle.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
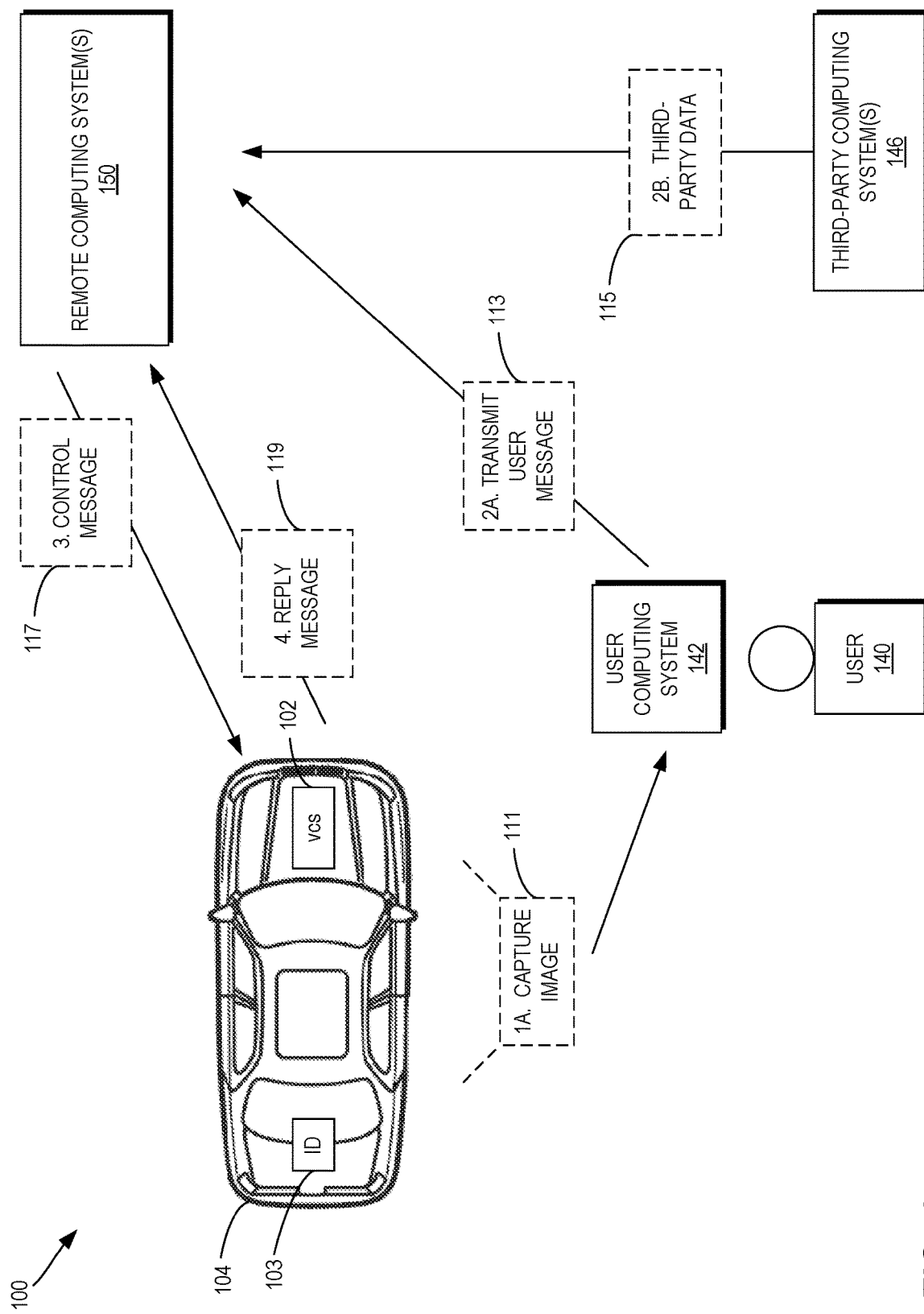
FIG. 1 depicts a block diagram of an example system overview including an autonomous vehicle according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally, the present disclosure is directed to systems and methods that enable a remote computing system to determine a status associated with an autonomous vehicle, such as an external condition of the autonomous vehicle, and to respond with one or more automated control actions. In particular, the systems and methods of the present disclosure enable the determination of the status of an autonomous vehicle based on third-party communications. For example, a remote computing system associated with a service entity for an autonomous vehicle can receive a message transmitted by a client computing device from a third-party observer. The remote computing system can determine a status of the autonomous vehicle based at least in part on the message. In another example, the remote computing system can access one or more third-party computing systems that provide third-party content, such as a data stream provided by a third-party server associated with a third-party publishing computing system, and determine a status of an autonomous vehicle based on an analysis of the third-party content. The remote computing system can transmit one or more control messages to the autonomous vehicle based on a determined status.

More particularly, in some implementations, the third-party communication may include information from which a predetermined identifier of an autonomous vehicle associated with a service entity can be determined. The remote computing system can determine a status associated with the autonomous vehicle based on information in the third-party communication, or from information determined based at least in part on the third-party communication. The remote computing system can determine one or more appropriate control actions to take based on the status of the autonomous vehicle. After determining an appropriate control action(s), the remote computing system can transmit one or more control messages identifying the one or more control actions to the appropriate autonomous vehicle based at least in part on the predetermined identifier.

The predetermined identifier may be included in the third-party communication or may be derived from the third-party communication. For example, the predetermined identifier may be transmitted with a message from a user client device or may be posted in publicly-available information, such as that provided by third-party content providers. The predetermined identifier can be determined from a textual analysis of the message or posting.

In another example, the third-party communication may include imagery depicting at least a portion of an autonomous vehicle. The predetermined identifier may be determined based on an analysis of the imagery. In one example, the imagery can be analyzed to detect the predetermined identifier in the imagery. For instance, an autonomous vehicle may provide the predetermined identifier on an external surface of the vehicle or may display the predetermined identifier from an interior region of the autonomous vehicle. The imagery may be analyzed to detect the predetermined identifier. In some examples, the imagery may be provided as input to a machine-learned model configured to generate a predetermined identifier based on images of autonomous vehicles.

In yet another example, the predetermined identifier may be determined based on a time and/or location associated with the third-party communication. For instance, the remote computing system may determine a time and location from metadata included in a message or within media included with a message. The remote computing system can access movement records associated with autonomous vehicles of the service entity. The remote computing system can correlate the time and location from the third-party communication with the movement records to determine an autonomous vehicle that was likely at the indicated location at the indicated time.

Examples of predetermined identifiers include, but are not limited to, numeric codes, alphanumeric codes, color codes, binary codes, machine-readable codes (e.g., bar codes, matrix codes, etc.). Any suitable encoding of information that can be used as a unique identifier of an autonomous vehicle can be used. In some instances, the predetermined identifier can be provided for external perception in association with the autonomous vehicle. For example, the predetermined identifier may be at least temporarily affixed to the autonomous vehicle. By way of example, the predetermined identifier may be provided on an external surface of the autonomous vehicle. A bar code or other code can be integrated within the external surface of an autonomous vehicle, such as within a paint scheme or as a sticker or other applique of the autonomous vehicle so as not to be readily perceptible to the human eye. In another specific example, the predetermined identifier can be displayed from an interior region of the autonomous vehicle, such as on a sign, electric or otherwise, that can be visually perceived from locations external to the autonomous vehicle.

An external observer of the autonomous vehicle may use a client or user computing system to obtain sensor data such as imagery depicting the autonomous vehicle. The imagery may include the predetermined identifier provided by the autonomous vehicle. The client computing device can transmit a user message to the remote computing system including the imagery. The remote computing system can analyze the imagery to determine the predetermined identifier associated with the autonomous vehicle.

In some examples, the remote computing system can determine a status associated with the autonomous vehicle based on information in a third-party communication. In a simple example, a user may provide information relating to the status of the autonomous vehicle directly in a user message transmitted to the remote computing system. For instance, the service entity associated with the remote computing system can provide a user application that can be executed by a client computing device. A user may be able to enter information pertaining to an autonomous vehicle in the user application in order to transmit the information to the remote computing system. In another example, a user may transmit a text message, or other electronic message conveying status information relating to an autonomous vehicle. For example, a user may indicate in a text or other message that a portion of an autonomous vehicle has been vandalized, that an autonomous vehicle failed to obey traffic norms such as traffic signs, that an autonomous vehicle appears damaged, etc.

In some examples, the remote computing system can determine a status associated with the autonomous vehicle based at least in part on an analysis of imagery transmitted with a user message and/or accessed from a third-party computing system. For instance, imagery depicting the autonomous vehicle can undergo image analysis to identify the condition of the external portion of the autonomous vehicle. The status of the autonomous vehicle can be determined based on an analysis of the identified condition. In some examples, imagery depicting the autonomous vehicle can be provided to one or more machine-learned models configured to generate an indication of a vehicle status based on imagery of vehicles.

The remote computing system may additionally or alternatively use sensor data associated with the autonomous vehicle in order to determine a status of the autonomous vehicle. For example, the remote computing system may respond to a third-party communication by determining the predetermined identifier associated with the autonomous vehicle. After determining the predetermined identifier, the remote computing system can issue one or more requests to the identified autonomous vehicle for sensor data. In response to the one or more requests, the autonomous vehicle can transmit sensor data to the remote computing system. The remote computing system can analyze the sensor data to determine the status associated with the autonomous vehicle.

The remote computing system may receive or otherwise obtain sensor data from a sensor system of the autonomous vehicle. More particularly, in some implementations, the remote computing system can receive sensor data from one or more sensors that are configured to generate sensor data relative to the autonomous vehicle. In order to autonomously navigate, the autonomous vehicle can include a plurality of sensors (e.g., a LIDAR system, radar system, cameras, etc.) configured to obtain sensor data associated with the autonomous vehicle's surrounding environment as well as the position and movement of the autonomous vehicle. The sensor data from one or more of these sensors may be transmitted to the remote computing system. The autonomous vehicle may optionally include a plurality of additional sensors such as inertial measurement unit (IMU) sensors, pressure sensors, contact strip sensors, suspension travel sensors, laser sensors, sound sensors, and/or any other suitable sensor to determine information about the autonomous vehicle or its surrounding environment. The sensor data may be used to generate detections, classifications, and/or predictions by one or more machine-learned models or other systems of the vehicle computing system.

Various control actions may be determined for an autonomous vehicle based on a determined status by the remote computing system. By way of example, the remote computing system may analyze a third-party communication, imagery, and/or sensor data to determine one of a plurality of predetermined statuses for an autonomous vehicle. The remote computing system may determine that an autonomous vehicle is safe or suitable to continue with a vehicle service or is not safe or suitable to continue with a vehicle service. Any number and type of vehicle statuses can be used to represent different states or conditions of the autonomous vehicle. For instance, an intermediate status may be defined where the autonomous vehicle is not suitable to transport passengers, but is suitable for limited autonomous navigation.

Based on a safe to continue status, the remote computing system may determine that no further control action is needed. The remote computing system may optionally transmit one or more control messages to the autonomous vehicle indicating that the autonomous vehicle can proceed with a primary motion plan to a target destination (e.g., initiate travel).

Based on a not safe to continue status, the remote computing system may generate one or more control messages to the autonomous vehicle indicating that the autonomous vehicle should proceed to a safe state. In response, the autonomous vehicle can initiate a motion plan that can include a trajectory to and a controlled stop at a destination representing a safe state. For example, the controlled stop may be at a destination outside of a flow of traffic, such as in a designated parking location or emergency shoulder. A vehicle computing system associated with the autonomous vehicle may initiate additional actions at the autonomous vehicle in response to the one or more messages. For example, the vehicle computing system may activate one or more hazards signals such as visible light indicators of the autonomous vehicle in response to the one or more messages.

In the case of an intermediate status, for example, the remote computing system may initiate one or more control actions instructing the autonomous vehicle to proceed to a nearest maintenance depot or other location of a service entity associated with the autonomous vehicle. The control messages may indicate that the autonomous vehicle is safe to proceed (e.g., initiate travel) without carrying passengers.

In some implementations, the remote computing system can transmit a control message to the autonomous vehicle to initiate a remote recovery of the autonomous vehicle or an on-site recovery of the autonomous vehicle after the vehicle has come to a controlled stop in a safe state. For example, the remote computing system may instruct the autonomous vehicle to come to a controlled stop at a destination representing a safe state so that further analysis of the vehicle can be performed. If the remote computing system determines that the autonomous vehicle is in a safe operational state after further analysis following a stop, for example, it may determine that the vehicle can proceed (e.g., initiate travel) to a target destination associated with its primary motion plan. The remote computing system can respond by transmitting remote recovery data to the vehicle computing system. Remote recovery data may generally include data related to further autonomous operation of the autonomous vehicle. For example, remote recovery data may include data related to recovering the autonomous vehicle automatically. The remote recovery data may include information to reset any fault conditions associated with the autonomous vehicle, etc. The remote recovery data can include instructions for the autonomous vehicle to initiate travel according to the primary motion plan or to generate a new motion plan to the target location. According to another example, the remote recovery data may include instructions for the autonomous vehicle to travel to a service or maintenance depot, such as in response to determining that the autonomous vehicle is safe to operate but should not be used to transport passengers and/or cargo. The remote recovery data may also include instructions generated from input provided by a remote human operator for controlling the autonomous vehicle.

In some implementations, when the remote computing system determines that the autonomous vehicle should not proceed with a vehicle service, it can respond by transmitting on-site recovery data to the vehicle computing system. On-site recovery data may include data related to recovering the autonomous vehicle from its current location. The on-site recovery data may also include data related to the autonomous vehicle. For example, data to be retrieved by a technician, mechanic, or other personnel dispatched to the location of the autonomous vehicle may be sent as on-site recovery data. The recovery plan may include information for completing a vehicle service associated with the autonomous vehicle. For example, if the autonomous vehicle is carrying one or more passengers and is unable to proceed to its target destination, the remote computing system can send a backup autonomous vehicle to pick up the one or more passengers. The recovery data may provide an indication that can be displayed by the vehicle computing system to the one or more passengers. For example, the indication may indicate to the one or more passengers that a backup autonomous vehicle is headed to a current location to pick up the one or more passengers and take them to a target destination. The recovery plan may include information identifying the backup autonomous vehicle or other vehicle being sent to carry the passengers to their target destination. Additionally, the remote computing system can send one or more messages, such as text messages, phone calls, or other messages to the one or more passengers, which can include an identifier or other information related to the backup autonomous vehicle. As another example, the vehicle computing system can send one or more messages to the one or more passengers indicating the identifier or other information related to the backup autonomous vehicle. Additionally or alternatively, the vehicle computing system can display or otherwise communicate the identifier or other information related to the backup autonomous vehicle.

In some implementations, the remote computing system and/or the vehicle computing system of the autonomous vehicle can be configured to interface with one or more third party computing systems. For instance, the remote computing system can respond to a third-party communication by transmitting one or more signals from the remote computing system to a computing system associated with one or more emergency service providers. For example, the remote computing system can transmit a message for emergency assistance at the location of the autonomous vehicle. In another example, the autonomous vehicle can directly transmit one or more signals such as a notification of the location of the autonomous vehicle to one or more emergency service providers. The remote computing system and/or the vehicle computing system may transmit signals to other third-party computing systems, such as computing systems associated with vehicle recovery services or other third-party services.

In some implementations, one or more machine-learned models can be used to determine predetermined identifiers associated with third-party communications and/or to determine a status associated with an autonomous vehicle. A machine-learned model may be trained to determine predetermined identifiers associated with third-party communications using annotated sensor data in some examples. For instance, training data such as image data labeled as corresponding to autonomous vehicles including predetermined identifiers (e.g., a positive data training set) may be used to train one or more machine-learned models to detect and associate images containing the predetermined identifiers. Additional training data such as image data labeled as not corresponding to a predetermined identifier (e.g., a negative data training set) may be used to further train the machine-learned model.

A machine-learned model may additionally or alternatively be trained to generate an indication of a vehicle status based on third-party communications using annotated sensor data in some examples. For instance, training data such as image data labeled as corresponding to a particular vehicle status (e.g., a positive data training set) may be used to train one or more machine-learned models to predict a vehicle status. Additional training data such as sensor data labeled as not corresponding to a particular status (e.g., a negative data training set) may be used to further train the machine-learned model.

According to one example aspect of the present disclosure, a remote computing system associated with the service entity can access one or more third-party communications associated with an autonomous vehicle. The third-party communications may be transmitted directly to the remote computing system or may be accessed by the remote computing system. For example, third-party communications may include email messages, text messages, web-based messages, or other electronic messages. Additionally, third-party communications may include third-party data streams provided by third-party computing systems. The remote computing system can determine, based at least in part on an analysis of the third-party communication, a predetermined identifier associated with the autonomous vehicle. Additionally, the remote computing system can determine a status associated with the autonomous vehicle based at least in part on the third-party communication. In some examples, the status may indicate a condition associated with the autonomous vehicle, such as a condition of one or more external surfaces of the autonomous vehicle. The remote computing system can then transmit one or more control messages to the autonomous vehicle based at least in part on the predetermined identifier and the status associated with the autonomous vehicle. The remote computing system can optionally transmit one or more reply messages to a client computing system associated with the third-party communication.

In some examples, the third-party communication can include imagery depicting at least a portion of the autonomous vehicle. In such instances, determining the predetermined identifier may include detecting the predetermined identifier based at least in part on an analysis of the imagery. In other examples, the predetermined identifier may be determined based at least in part on metadata associated with the third-party communication. In yet another example, the predetermined identifier may be determined by correlating a time and/or location associated with a third-party communication with autonomous vehicle movement records of the service entity.

In some examples, the remote computing system may transmit a control message instructing an autonomous vehicle to execute a controlled stop to a safe state. For example, a control message may instruct the autonomous vehicle to execute a motion plan (e.g., initiate travel) including a trajectory to a destination representing a safe state outside of a flow of the lane of traffic. In another example, the remote computing system may transmit a control message instructing the autonomous vehicle to proceed to a predetermined location.

The systems and methods described herein may provide a number of technical effects and benefits, particularly in the areas of autonomous vehicles and computing technology. By way of example, an autonomous vehicle may display a predetermined identifier which can be automatically detected by various computing systems. In this manner, a remote computing system such as a client computing device can be used to capture an image of the autonomous vehicle which can then be transmitted to a remote computing system associated with a service entity. The remote computing system can identify the autonomous vehicle associated with the transmission as well as a status of the autonomous vehicle based at least partially on the transmission. The remote computing system can generate control actions for the appropriate autonomous vehicle based on the determined status.

In a particular example, the disclosed techniques enable a computing system to automatically detect a status associated with an autonomous vehicle and in response, cause the vehicle to proceed to a controlled stop in a safe state or to perform another control action. Such an approach can facilitate the automatic operation of autonomous vehicles in a safe and responsible manner. Additionally, a remote computing system may interface with third-party computing systems associated with emergency personnel or other relevant third-parties. This approach can facilitate a rapid response of emergency services as well as a rapid reply to facilitate transporting passengers in the autonomous vehicle to a requested destination, thereby improving both passenger and bystander safety. For example, a remote computing system can respond automatically to events by ordering a backup autonomous vehicle to proceed to the location of a disabled autonomous vehicle and carry passengers to the target destination.

The systems and methods described herein may provide a particular technical benefit for vehicle computing systems of autonomous vehicles, as well as remote computing systems associated with operation of autonomous vehicles and/or fleets of autonomous vehicles. For instance, a remote computing system can automatically detect a status associated with an autonomous vehicle based on third-party communications and transmit one or more control messages to the autonomous vehicle. The automatic detection of vehicle status and communication with autonomous vehicles can enable a rapid response using automated computer communications.

With reference now to the Figures, example embodiments of the present disclosure will be discussed in further detail. FIG. 1 depicts an example system 100 according to example embodiments of the present disclosure. The system 100 can include a vehicle computing system (VCS) 102 associated with a vehicle 104, a user computing system 142 associated with a user 140, a remote computing system 150 associated with one or more service entities for the vehicle 104, and one or more third-party computing systems 146. The vehicle 104 incorporating the vehicle computing system 102 can be a ground-based autonomous vehicle (e.g., car, truck, bus), an air-based autonomous vehicle (e.g., airplane, drone, helicopter, or other aircraft), or other types of vehicles (e.g., watercraft). The vehicle 104 can be an autonomous vehicle that can drive, navigate, operate, etc. with minimal and/or no interaction from a human driver.

Remote computing system(s) 150 are remote from the vehicle 104 and user computing system 142, and are associated with one or more service entities. A service entity may be an operator of one or more services associated with vehicle 104 or a fleet of vehicles including vehicle 104. A service entity may be a direct operator of services associated with a fleet of vehicles including vehicle 104, or may be an indirect operator of services associated with vehicle 104. For example, a service entity may be an operator of transportation and/or mobility market services, maintenance services, dispatch services, client relation management services, etc. associated with vehicle 104.

The user computing system 142 can be associated with a user 140, and can communicate with the remote computing system 150. In some examples, the user computing system 142 may additionally communicate with the vehicle computing system 102. Examples of user computing systems 142 include mobile phones, smart phones, mobile computers, desktop computers, tablet computers, etc.

In some examples, the third-party computing system(s) 146 can be associated with one or more third-parties that provide a platform for receiving, generating, sharing, and/or distributing third-party data. By way of example, a third-party computing system may provide a data stream of publically accessible content. The content may be generated by a third-party directly associated with the computing system or may be generated by other parties. For example, a user 140 may generate content and provide that content to a third-party computing system 146. The third-party computing system may host or otherwise provide the content for access by other parties, such as in publically accessible data streams. The third-party computing systems may also include computing systems associated with third-parties such as emergency service providers, vehicle towing service providers, etc.

The user 140 can be a remote observer of the autonomous vehicle 104. In some examples, the user 140 may not have a direct affiliation with the vehicle 104 or a service entity associated with the vehicle, but instead is a third-party remote observer of the vehicle 104. In other examples, the user 140 may be associated with the vehicle or a service entity associated with the vehicle. For instance, user 140 may be a client or other individual that requests a vehicle service via the user computing system 142 (e.g., a mobile phone device). For example, the user 140 may generate a service request via a software application on the user computing system 142. The user computing system 142 can provide data indicative of the service request to the remote computing system 150 (e.g., which can assign the vehicle 104 to such a request).

Upon observing the vehicle, the user 140, whether a client or unaffiliated observer, may decide to share information regarding the vehicle 104 directly with a service entity, or indirectly using third-party platforms, for example. By way of example, a user may observe a vehicle that has been damaged and decide that the information may be of interest to a service entity. Other examples of observations that may be reported include, but are not limited to, observances of a vehicle 104 failing to obey traffic norms (e.g., failing to obey a traffic sign, speeding, etc.), damage associated with the vehicle, a vandalized vehicle, or any other observation that a user may determine could be of interest to a service entity associated with the vehicle 104. The user may send a third-party communication to remote computing system(s) 150 including information pertaining to an observance. For instance, a user may transmit a third-party communication including a description and/or imagery of an observation, such as a speeding or damaged vehicle.

FIG. 1 depicts an example where a user 140 captures imagery of the vehicle 104, such an image or video depicting the vehicle, with user computing system 142, as shown at 111. In this example, vehicle 104 includes a predetermined identifier (ID) 103 on an exterior surface of the vehicle 104. The predetermined identifier can be provided on an exterior surface (e.g., trunk lid, door, hood, roof, etc.) of the vehicle and/or in an interior region of the vehicle 104 at a location visible from regions outside of the vehicle. It will be appreciated that one or more predetermined identifiers may be provided in any suitable location on, in, or otherwise in association with a vehicle.

Any type of predetermined identifier may be used to uniquely identify a vehicle. Predetermined identifiers may be numeric codes, alphanumeric codes, color codes, binary codes, machine-readable codes (e.g., bar codes, matrix codes, etc.). Any suitable encoding of information that can be used as a unique identifier of an autonomous vehicle can be used. In some instances, the predetermined identifier can be provided for external perception in association with the autonomous vehicle. In some examples, a bar code or other code can be integrated within the external surface of an autonomous vehicle, such as within a paint scheme or as a sticker or other applique of the autonomous vehicle so as not to be readily perceptible to the human eye.

The user transmits the imagery depicting vehicle 104 or a portion of vehicle 104, to the remote computing system 150 as shown at 113. Although FIG. 1 depicts an example where a user transmits imagery or information based on imagery captured by the user computing system 142, such is not required. For example, a user may generate and send text or any other suitable data indicating a condition of the vehicle 104. For instance, a user may utilize a software application to input information pertaining to a vehicle. The information can then be communicated to the remote computing system 150 as shown at 113.

The user message transmitted at 113 includes the predetermined identifier associated with the vehicle or information from which the predetermined identifier can be determined. For example, the predetermined identifier may be included in the imagery captured by the user computing system 142 and transmitted to the remote computing system 150. In another example, a user may provide input indicating the predetermined identifier. For example, a user may observe the predetermined identifier and include it within a third-party communication. In yet another example, the predetermined identifier may be determined by the remote computing system (s) based on a time and/or location associated with the third-party communication. For instance, the remote computing system may correlate a time and/or location of the third-party communication with movement records to determine a predetermined identifier of a vehicle associated with that time and/or location.

A user message can be transmitted using any suitable format and/or protocol. By way of example, a user may send an electronic mail message, a text message or other short messaging service message, an internet-based message, or other electronic message to the remote computing system 150. In some implementations, the user may utilize a software application at the user computing system 142. The software application can be provided by or otherwise associated with a service entity and may allow a user to transmit imagery and/or other information related to observances of autonomous vehicles to the remote computing system.

Although not shown, the user may alternatively or additionally transmit a communication such as a message or internet posting to one or more third-party computing system. For example, a user may send imagery or other information related to the vehicle 104 to a third-party computing system 146. The third-party computing system 146 can then provide access to the information by other computing systems. For instance, a third-party computing system 146 may publish a data stream that can be accessed by other computing systems. A data stream or other content provided by third-party computing system 146 may include imagery and/or textual information provided by third-party observers or other entities. In some instances, the data provided by third-party computing system 146 may include information pertaining to vehicle 104.

Remote computing system 150 can access a third party communication including third-party data from the third-party computing system as shown at 115. For instance, the remote computing system may access a published data stream to analyze the content provided by the data stream. The remote computing systems 150 may scan the data stream or other content provided by third-party computing systems to detect one or more indications of a vehicle 104 associated with the remote computing system 150. By way of example, the remote computing systems 150 may analyze data published by third-party computing systems to detect one or more predetermined identifiers of a vehicle 104 associated with a service entity. In another example, the remote computing systems 150 may analyze data published by third-party computing systems to detect general information pertaining to autonomous vehicles in an effort to determine, based on further analysis, whether the information is pertinent to a vehicle 104 associated with the remote computing system 150.

The remote computing system 150 can analyze third-party communications received from a user computing system 142 and/or accessed at a third-party computing system 146 to determine a status associated with a vehicle 104. The remote computing system can determine a status associated with the vehicle based on the third-party communication directly in some implementations. For example, the remote computing system may perform image analysis, textual analysis, or other operations to determine a status of the vehicle based on the communication. The remote computing system may access additional information such as sensor data associated with the vehicle 104 as hereinafter described as part of determining a status associated with the vehicle. The status of the vehicle may indicate or otherwise provide an assessment of a vehicle's condition. Any number and type of vehicle statuses can be used to identify different states or conditions of the autonomous vehicle.

The remote computing system can determine a predetermined identifier associated with the vehicle based on the third-party communication. For example, the remote computing system may access a predetermined identifier included in a third-party communication, may perform image analysis to extract a predetermined identifier from imagery, and/or may perform time/location correlation to determine a predetermined identifier.

The remote computing system can transmit one or more control messages to the vehicle associated with the predetermined identifier as shown at 117. The control messages can be based on the status of the vehicle. The remote computing system can determine one or more appropriate control actions to take based on the status of the autonomous vehicle. After determining an appropriate control action(s), the remote computing system can transmit the one or more control messages to the appropriate autonomous vehicle based at least in part on the predetermined identifier. By way of example, the remote computing system may transmit a control message indicating that the autonomous vehicle should proceed to a controlled stop, for example, at a destination representing a safe state. Other control messages may indicate that an autonomous vehicle should proceed to a maintenance location or other specified location. In some examples, a control message may include an instruction for the vehicle 104 to transmit sensor data to the remote computing system. The remote computing system may analyze the sensor data to determine one or more additional control actions to initiate. In some examples, the one or more control messages transmitted from the remote computing system can initiate a remote recovery of the autonomous vehicle or an on-site recovery of the autonomous vehicle. For example, the remote computing system may transmit one or more control messages instructing the vehicle computing system 102 to generate a motion plan to bring the vehicle to a controlled stop. The one or more control messages may include instructions for a remove recovery causing the vehicle to proceed if it is determined to be in a safe operational state or instructions for an on-site recovery if the vehicle is determined to be unsuitable for proceeding with autonomous operations.

Vehicle computing system 102 at vehicle 104 may optionally transmit one or more reply messages to the remote computing system 150 as shown at 119. A reply message may include an indication of a receipt of a control message, an indication of a performance of a control action, or other information. In some examples, a reply message 119 may include sensor data associated with the vehicle. It will be appreciated that multiple control messages and reply messages may be exchanged as the remote computing system 150 gathers information from and provides instructions to the vehicle 104.

Figure 2:
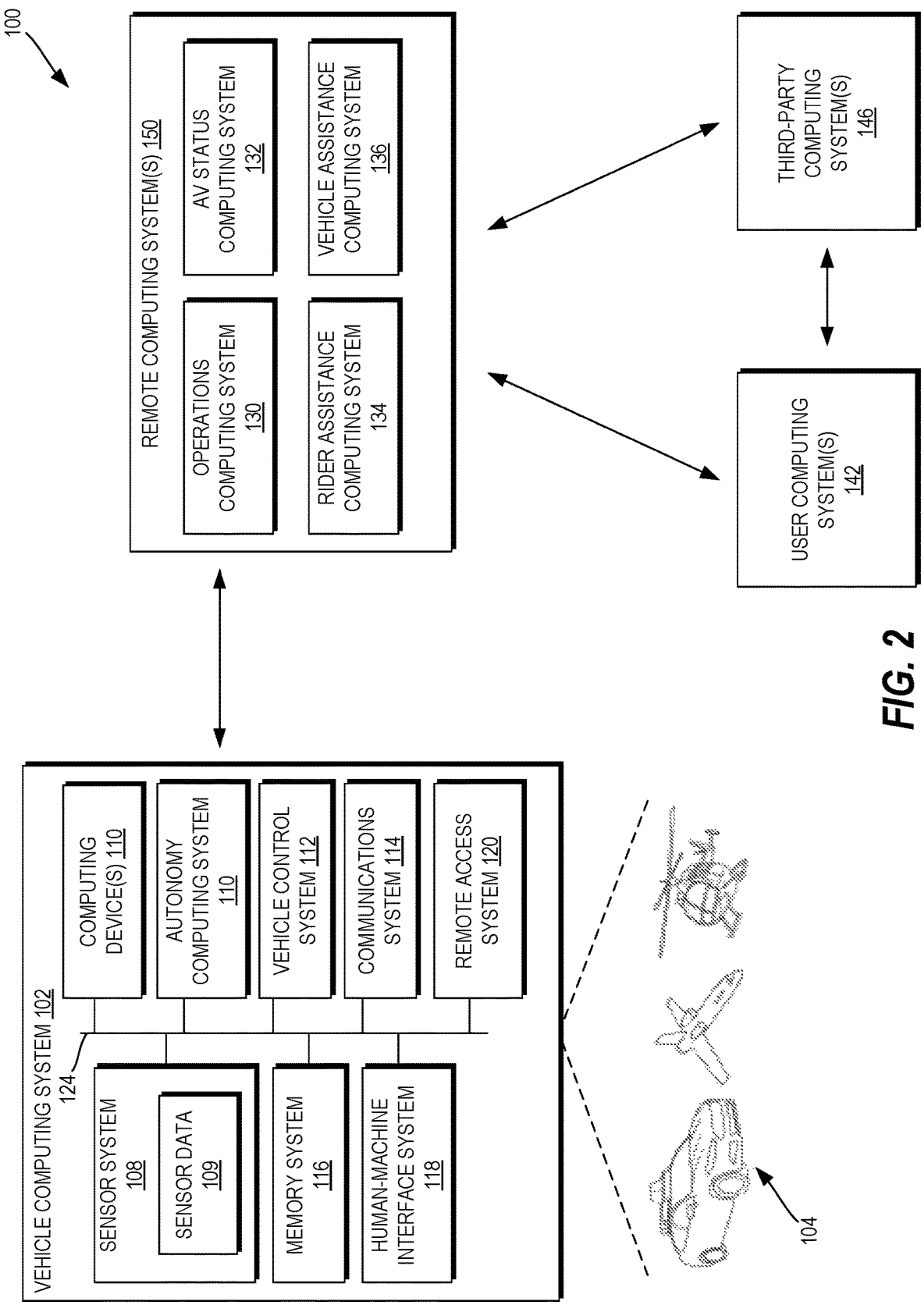
FIG. 2 depicts a block diagram of an example system overview including an autonomous vehicle and service entity computing system(s) according to example embodiments of the present disclosure.

FIG. 2 depicts additional details of the various computing systems of an example system 100 according to example embodiments of the present disclosure. The user computing system 142 can be associated with a user 140, and can communicate with the remote computing systems 150 to provide information pertaining to a vehicle 104. As an example, the user 140 can transmit data regarding a vehicle 104 to remote computing system 150 and/or third-party computing system 146 via the user computing system 142 (e.g., a mobile phone device). In some implementations, the user 140 can generate a third-party communication via the user computing system 142. For example, the user may generate a text message, Internet-based message, or other message using a software application on the user computing system 144. The third-party communication may include textual data, imagery, and/or data associated with a vehicle 104. In one example, the user may generate a third-party communication using a software application provided by a service entity associated with remote computing systems 150. The third-party computing systems 146 can be configured to provide data streams or other content. More particularly, the third-party computing systems may provide access to content generated with a user computing system 142.

The vehicle computing system 102 of a vehicle 104 can include one or more computing device(s) 122 located on-board the vehicle 104 (e.g., located on and/or within the vehicle 104). The computing device(s) 122 can include various components for performing various operations and functions. For instance, the computing device(s) 122 can include one or more processor(s) and one or more tangible, non-transitory, computer readable media. The one or more tangible, non-transitory, computer readable media can store data and instructions that when executed by the one or more processor(s) cause the vehicle 104 (e.g., its computing system, one or more processors, etc.) to perform operations and functions, such as those described herein.

As shown in FIG. 2, the vehicle computing system 102 can additionally include a sensor system 108 including one or more sensors, an autonomy computing system 110, a vehicle control system 112, a communications system 114, a memory system 116, a human-machine interface system 118, and a remote access system 120. One or more of these systems can be configured to communicate with one another via a communication channel 124. The communication channel can include one or more data buses (e.g., controller area network (CAN)), on-board diagnostics connector (e.g., OBD-II), and/or a combination of wired and/or wireless communication links. The on-board systems can send and/or receive data, messages, signals, etc. amongst one another via the communication channel.

The sensor system 108 can be configured to acquire sensor data 109 associated with one or more objects that are proximate to the vehicle 104 (e.g., within a field of view of one or more of the sensor(s)). The sensor system 108 can include sensors including a Light Detection and Ranging (LIDAR) system, a Radio Detection and Ranging (RADAR) system, one or more cameras (e.g., visible spectrum cameras, infrared cameras, etc.), motion sensors, and/or other types of imaging capture devices and/or sensors. The sensor data 109 can include image data, radar data, LIDAR data, and/or other data acquired by the sensors of the sensor system 108. The object(s) can include, for example, pedestrians, vehicles, bicycles, and/or other objects. The object(s) can be located in front of, to the rear of, to the side of the vehicle 104, etc. The sensor data 109 can be indicative of locations associated with the object(s) within the surrounding environment of the vehicle 104 at one or more times. The sensor system 108 can provide the sensor data 109 to the autonomy computing system 110.

In some implementations, the sensor system 108 can be configured to acquire sensor data 109 indicative of one or more parameters associated with the vehicle 104. As an example, the sensor data 109 can include image data, motion capture data, and/or other data acquired by the sensors indicative of one or more objects that occupy the interior environment of the vehicle 104, and/or one or more objects external to the vehicle 104. The object(s) can include one or more user(s), cargo, items/goods, and/or other object(s) associated with the vehicle service. The object(s) can include people, animals, objects, items/good, and/or other object(s) external to the vehicle. As another example, the sensor data 109 can include one or more sensor readings acquired by the sensors indicative of when a vehicle service is being provided by the vehicle 104. As another example, the sensor data 109 can include one or more sensor readings acquired by the sensors indicative of a health and operational status of the vehicle 104 (e.g., fuel level, charge level, engine conditions, tire pressure, conditions associated with the vehicle's interior, conditions associated with the vehicle's exterior, conditions associated with one or more systems onboard the vehicle, etc.).

The human-machine interface system 118 can be configured to allow interaction between a user (e.g., human), the vehicle 104 (e.g., vehicle computing system 102), and/or remote computing system 150 (e.g., an operator associated with the operations computing system 130). The human-machine interface system 118 can include a variety of interfaces for the user to input and/or receive information from the vehicle computing system 102. For example, the human-machine interface system 118 can include a graphical user interface, direct manipulation interface, web-based user interface, touch user interface, attentive user interface, conversational and/or voice interfaces (e.g., via text messages, chatter robot), conversational interface agent, interactive voice response (IVR) system, gesture interface, and/or other types of interfaces. The human-machine interface system 118 can include one or more input device(s) (e.g., touchscreens, keypad, touchpad, knobs, buttons, sliders, switches, mouse, gyroscope, microphone, other hardware interfaces) configured to receive user input. The human-machine interface system 118 can also include one or more output device(s) (e.g., display devices, speakers, lights) to receive and output data associated with the interfaces.

Vehicle computing system 102 includes a remote access system 120 that facilitates remote access and control of the autonomous vehicle 104 by one or more remote computing systems 150. Remote access system can provide an interface between the vehicle computing system 102 and one or more remote computing systems. By way of example, remote access system 120 may receive control messages from the remote computing system and translate the control messages into commands for one or more components of the vehicle computing systems 102. For example, remote access system 120 can receive control commands and generate vehicle control commands for vehicle control system 112 and/or control commands for autonomy computing system 110. As a specific example, the remote access system may transition the vehicle computing system 102 from controlling the autonomous vehicle according to a primary motion plan to controlling the autonomous vehicle according to a backup motion plan in response to a control message from a remote computing system. The backup motion plan may include bringing the autonomous vehicle to a controlled stop or causing the vehicle to travel to an alternate destination (e.g, maintenance location). A controlled stop may be outside of a flow of traffic in some examples to provide a safe stop for the autonomous vehicle in order for further inspection and analysis to be performed. The backup motion plan can include a second trajectory for controlling the autonomous vehicle to a safe state including the controlled stop. The controlled stop may be at a destination outside of a flow of traffic, such as in a designated parking location or emergency shoulder. A controlled stop can be contrasted with an emergency stop that may be performed in response to an emergency detection. For example, a controlled stop can include a trajectory to a destination that is determined to be safe. Moreover, the controlled stop need not be immediate and can be initiated in a manner to avoid discomfort to riders of the vehicle. This may be contrasted with applying full brake pressure in response to detecting an object in the vehicle's motion path.

The vehicle computing system 102 may initiate additional actions at the autonomous vehicle in response to control messages from the remote computing system. For example, the vehicle computing system 102 may activate one or more hazards signals such as visible light indicators of the autonomous vehicle in response to a control message. As another example, the vehicle computing system 102 may transmit sensor data 109 from the vehicle 104 to the remote computing system.

FIG. 2 also depicts additional details of an example of the one or more remote computing system 150 in accordance with example embodiments of the present disclosure. The remote computing system 150 can include operations computing system(s) 130, AV status computing system(s) 132, rider assistance computing system(s) 134, and vehicle assistance computing system(s) 136. The remote computing system(s) 150 can be separate from one another or share computing device(s). In some implementations, the operations computing system 130 can remotely manage the vehicle 104. It will be appreciated that additional or fewer remote computing systems 150 may be used according to various implementations. Moreover, different configurations may be used. For instance, operations computing system 130 may perform the operations and functions of rider assistance computing system 134 and/or vehicle assistance computing system 136.

In some implementations, the operations computing system 130 can remotely manage the vehicle 104. As an example, a client user 140 can request a vehicle service via the user computing system 142 (e.g., a mobile phone device). In some implementations, the client user 140 can generate a service request via a software application on the user computing system 142. The user computing system 142 can provide data indicative of the service request to the operations computing system 130 (e.g., which can assign the vehicle 104 to such a request).

AV status computing system 132 is configured to determine a status associated with a vehicle 104 based on third-party communications, and to generate one or more control messages to a vehicle 104 based on the status of the vehicle. AV status computing system 132 may receive third-party communications directly from user computer system 142 in some examples. The user computing system 142 can provide data associated with a vehicle to the AV status computing system 132 of remote computing system 150 in some examples. Additionally or alternatively, AV status computing system 132 may access third-party communications provided by third-party computing system 146. AV status computing system 132 can analyze third-party communications to determine a predetermined identifier associated with the vehicle 104, as well as the status associated with the vehicle 104. Additionally, in response to a particular set of one or more predetermined statuses, the AV status computing system 132 may generate one or more control messages to the vehicle computing system 102 of vehicle 104. In some examples, vehicle assistance computing system 136 may generate one or more control messages to the vehicle 104 based on a status determined by AV status computing system 132.

Rider assistance computing system 134 can coordinate communication and other interactions with one or more passengers of an autonomous vehicle 104. For example, rider assistance computing system 134 can generate messages to be transmitted to the vehicle computing system 102 and/or a user computing system 142 associated with a passenger user 140 of an autonomous vehicle 104. For example, rider assistance computing system 134 can generate one or more messages such as phone calls, text messages, direct messages or other messages to a passenger by transmitting such messages to a user computing system 142. In another example, rider assistance computing system 134 can transmit one or more messages or other information directly to a vehicle computing system 102 in association with a status determined from a third-party communication. For example, if the remote computing system 150 determines that the vehicle should not complete a current vehicle service, rider assistance computing system 134 can transmit one or more messages to the vehicle computing system 102. The one or more messages may include information to be displayed or otherwise provided to a passenger of the vehicle 104. The messages can include information relating to a recovery plan in in some examples. By way of example, the message may indicate or describe a backup autonomous vehicle that is being dispatched to service a passenger in order to complete a vehicle service associated with the autonomous vehicle.

The vehicle assistance computing system 136 can communicate with the operations computing system 130 and vehicle computing system 102 to provide assistance services for vehicles 104. As an example, the vehicle assistance computing system 136 can provide the operations computing system 130 with information indicative of a status of one or more vehicles. If the status indicates that a vehicle is not suitable for vehicle services, the operations computing system 130 can initiate a recovery plan by selecting a recovery team to perform on-site recovery of an autonomous vehicle (e.g., vehicle 104) based on the information provided by the vehicle assistance computing system 136.

Figure 3:
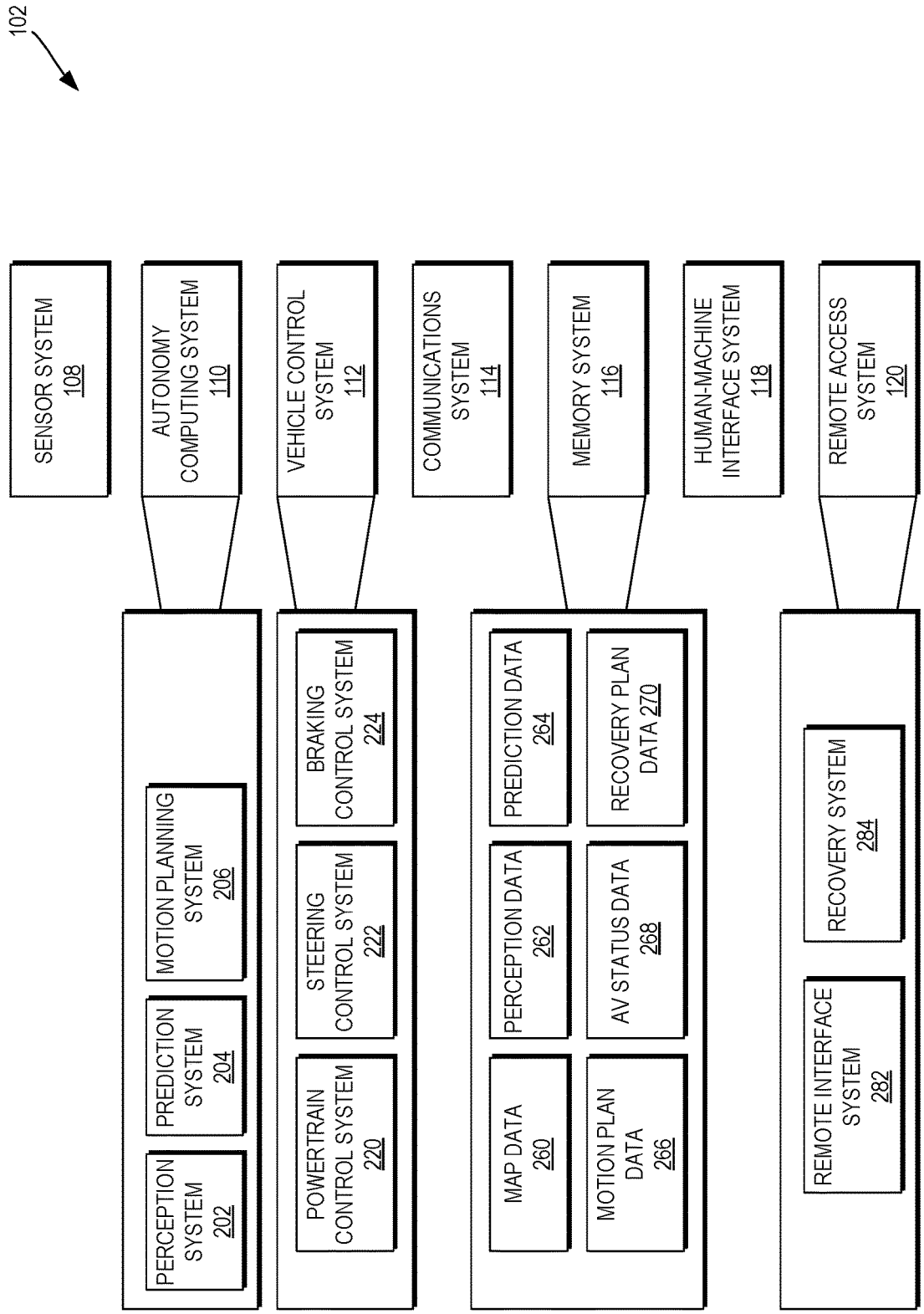
FIG. 3 depicts of a block diagram of an example vehicle computing system according to example embodiments of the present disclosure.

FIG. 3 depicts a block diagram of an example vehicle computing system 102 according to example embodiments of the present disclosure. FIG. 3 depicts the various systems of the vehicle computing system, including additional details of autonomy computing system 110, vehicle control system 112, memory system 116, and remote access system 120. As shown in FIG. 3, the autonomy computing system 110 can include a perception system 202, a prediction system 204, a motion planning system 206, and/or other systems that cooperate to perceive the surrounding environment of the vehicle 104 and determine a motion plan for controlling the motion of the vehicle 104 accordingly. For example, the autonomy computing system 110 can receive the sensor data 109 from the sensor system 108, attempt to comprehend the surrounding environment by performing various processing techniques on the sensor data 109 (and/or other data), and generate an appropriate motion plan through such surrounding environment. The autonomy computing system 110 can control the one or more vehicle control systems 112 to operate the vehicle 104 according to the motion plan.

The autonomy computing system 110 can identify one or more objects that are proximate to the vehicle 104 based at least in part on the sensor data 109 and/or the map data 260. For instance, the perception system 202 can perform various processing techniques on the sensor data 109 to determine perception data 262 that is descriptive of a current state of one or more object(s) that are proximate to the vehicle 104. The prediction system 204 can create prediction data 264 associated with each of the respective one or more object(s) proximate to the vehicle 104. The prediction data 264 can be indicative of one or more predicted future locations of each respective object. The motion planning system 206 can determine a motion plan for the vehicle 104 based at least in part on the prediction data 264 (and/or other data), and save the motion plan as motion plan data 266. The motion plan data 266 can include vehicle actions with respect to the object(s) proximate to the vehicle 104 as well as the predicted movements. The motion plan data 266 can include a planned trajectory, speed, acceleration, etc. of the vehicle 104.

The motion planning system 206 can provide at least a portion of the motion plan data 266 that indicates one or more vehicle actions, a planned trajectory, and/or other operating parameters to the vehicle control system 112 to implement the motion plan for the vehicle 104. For instance, the vehicle 104 can include a mobility controller configured to translate the motion plan data 266 into instructions. By way of example, the mobility controller can translate the motion plan data 266 into instructions to adjust the steering of the vehicle 104 "X" degrees, apply a certain magnitude of braking force, etc. The mobility controller can send one or more control signals to the responsible vehicle control sub-system (e.g., powertrain control system 220, steering control system 222, braking control system 224) to execute the instructions and implement the motion plan.

The communications system 114 can allow the vehicle computing system 102 (and its computing system(s)) to communicate with other computing systems (e.g., remote computing system(s) 150). The vehicle computing system 102 can use the communications system 114 to communicate with the operations computing system 130 and/or one or more other remote computing system(s) over one or more networks (e.g., via one or more wireless signal connections). In some implementations, the communications system 114 can allow communication among one or more of the system(s) on-board the vehicle 104. The communications system 114 can include any suitable sub-systems for interfacing with one or more network(s), including, for example, transmitters, receivers, ports, controllers, antennas, and/or other suitable sub-systems that can help facilitate communication.

The memory system 116 can include one or more memory devices located at the same or different locations (e.g., on-board the vehicle 104, distributed throughout the vehicle 104, off-board the vehicle 104, etc.). The vehicle computing system 102 can use the memory system 116 to store and retrieve data/information. For instance, the memory system 116 can store map data 260, perception data 262, prediction data 264, motion plan data 266, AV status data 268, and recovery plan data 270.

The map data 260 can include information regarding: an identity and location of different roadways, road segments, buildings, or other items or objects (e.g., lampposts, crosswalks, curbing, etc.); a location and direction of traffic lanes (e.g., the location and direction of a parking lane, a turning lane, a bicycle lane, or other lanes within a particular roadway or other travel way and/or one or more boundary markings associated therewith); and/or any other data that assists the vehicle computing system 102 in comprehending and perceiving its surrounding environment and its relationship thereto.

Remote access system 120 is configured to provide an interface with a remote computing system 150 for controlling the vehicle 104. Remote access system 120 includes a remote interface system 282 configured to communicate with one or more remote computing systems 150. The remote interface system 282 may receive one or more control messages from a remote computing system 150 and/or generate reply messages to the remote computing system (e.g., including sensor data).

Remote interface system 282 can initiate one or more control actions at the vehicle 104 in response to one or more control messages received from a remote computing system 150. Remote interface system 282 can initiate a backup motion plan in response to a control message in some examples. For example, remote interface system 282 may indicate to motion planning system 206 that a backup motion plan should be followed in response to a control message from the remote computing system 150 indicating that vehicle 104 should not proceed with vehicle services. The backup motion plan can include controlling the autonomous vehicle to a safe state including the controlled stop. For example the backup motion plan may comprise a secondary trajectory that moves the autonomous vehicle to a destination that represents the safe state. Remote interface system 282 may initiate other control actions, such as sending a message to vehicle control system 112 to active hazard signals, or to engage an emergency brake after the autonomous vehicle has stopped. Remote interface system 282 may further initiate communication with a remote computing system using communications system 286. For example, the remote interface system 282 may transmit one or more packets, messages, or other signals including an identification of a vehicle status and/or sensor data.

The remote access system 120 may additionally include a recovery system 284 configured to determine and/or initiate one or more recovery plans in response to a control message from a remote computing system 150. In some examples, the recovery system 284 may be configured to receive one or more recovery plans from a remote computing device, such as vehicle assistance computing system 136. For instance, vehicle assistance computing system 136 may determine a recovery plan based on a third party communication and/or sensor data 109 received from the autonomous vehicle. Vehicle assistance computing system 136 can transmit one or more control messages to the autonomous vehicle including the recovery plan data. The recovery system 284 may be configured to execute one or more recovery plans in response to the off-board analysis of the vehicle status.

The AV status data 268 can include data indicative of an operational or other status associated with the vehicle 104. For example, the AV status data 268 can include data indicating that the vehicle 104 is in a fully operational state, data indicating that the vehicle is in a semi-operational state (e.g., intermediate state), or data indicating that the vehicle is in a non-operational state. It will be appreciated the AV status data 268 may include or indicate any number and/or type of statuses associated with a vehicle. The vehicle computing system 102 can obtain the AV status data 268 in one or more control messages received from a remote computing system 150 in some examples.

The recovery plan data 272 can include data indicative of one or more recovery plan(s) associated with the vehicle 104. As an example, the recovery plan data 272 can include data indicative of one or more actions to be taken by the vehicle computing system 102. The one or more actions can include, for example, stopping a motion of the vehicle 104, rejecting any additional service requests, performing diagnostics maneuvers, providing information to a user, etc. The recovery plan data 272 can be on-site recovery plan data including information relating to an on-site recovery of the vehicle and/or alternate fulfillment of a service request. For example, the recovery plan data 272 can include data indicative of a recovery team being sent to a location of the vehicle 104 (e.g., human operator, another autonomous vehicle, etc.), medical personnel being sent to assist a user, an estimated wait time, etc. The recovery plan data 272 can be remote recovery plan data including information relating to a remote recovery of the vehicle. For example, the recovery plan data 272 can include instructions to cause the vehicle computing system to reset any fault conditions. The recovery plan data 272 can include information for the passengers relating to the continued vehicle service by the autonomous vehicle. The vehicle computing system 102 can obtain the recovery plan data 272 from the remote computing system(s) 150 (e.g., operations computing system 130).

Figure 4:
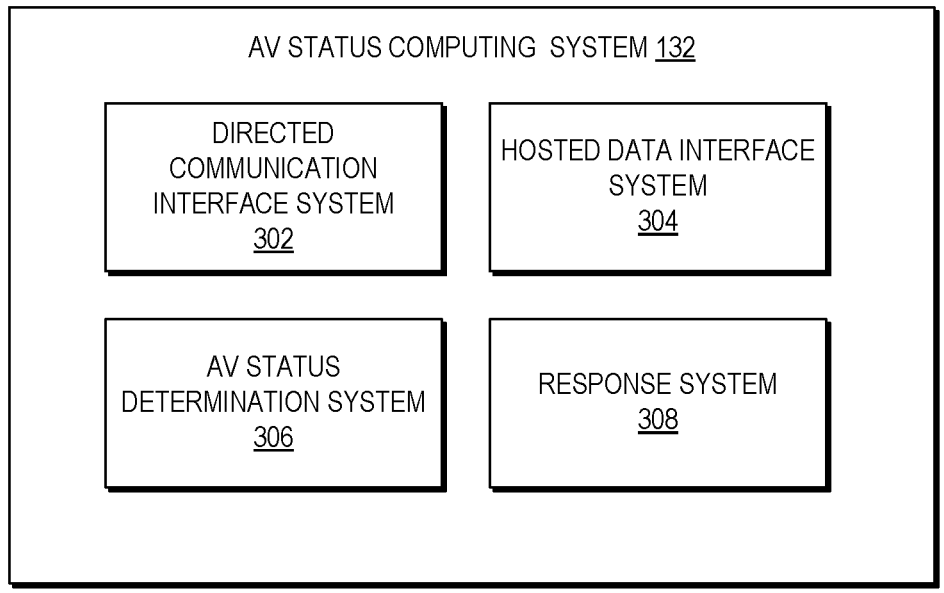
FIG. 4 depicts of a block diagram of an example autonomous vehicle status computing system according to example embodiments of the present disclosure.

FIG. 4 is a block diagram depicting additional details of an example AV status computing system 132 according to example embodiments of the present disclosure. In example of FIG. 4, AV status computing system 132 includes a directed communication interface system 302, a hosted data interface system 304, an AV status determination system 306, and a response system 308.

Directed communication interface system 302 is configured to receive and/or respond to third-party communications transmitted to the remote computing systems by a user computing system 142. By way of example, directed communication interface system 302 may be configured to receive text messages, email messages, Internet-based messages, messages through a software application associated with the service entity, or other electronic messages. Directed communication interface system 302 may receive textual data, image data, sensor data, or other data associated with the third-party communication.

Hosted data interface system 304 is configured to access third-party communications provided by third-party computing systems such as third-party computing systems 146. For example, hosted data interface system 304 may access the data stream or other publication of content provided by third-party computing system. Hosted data interface system 304 may scan such a data stream or other publication to identify information associated with a vehicle 104. For example, a hosted data interface system 304 may analyze the data stream to detect a predetermined identifier associated with the vehicle 104 of a service entity associated with the remote computing system 150.

AV status determination system 306 is configured to analyze third-party communications to determine a status associated with the vehicle corresponding to the third-party communication. For example, directed communication interface system 302 may provide textual data or imagery from third-party communication to the AV status determination system 306 for analysis. AV status determination system 306 may perform textual analysis, image analysis, or other processing in order to determine a status associated with the vehicle. AV status determination system 306 may analyze data from a third-party communication to determine a predetermined identifier associated with an autonomous vehicle. For example, AV status determination system 306 may analyze imagery to detect a predetermined identifier associated with the vehicle 104 depicted in the imagery. In another example, AV status determination system 306 can analyze textual data to determine a predetermined identifier associated with an autonomous vehicle 104.

AV status determination system 306 may utilize other sources of data or information to determine a status of vehicle 104. For example, AV status determination system 306 may access sensor data associated with a vehicle 104 corresponding to a third-party communication. In one example, AV status determination system 306 may send a communication such as a control message to the vehicle 104 requesting that the vehicle respond with sensor data. The AV status determination system 306 can analyze the sensor data as part of determining a status associated with vehicle 104.

In some examples, AV status determination system 306 may determine a vehicle status based on a condition of the vehicle. The determination system may analyze sensor data for other data such as included with the third-party communication to determine a condition of the vehicle 104. By way of example, sensor data from the vehicle may depict an exterior surface of the vehicle from which a condition of the vehicle can be determined by the AV status determination system 306. In another example, an image transmitted with the third-party communication can be analyzed to determine a condition of the vehicle, such as a condition of the external surface of the vehicle. In other examples, imagery or other data may indicate environmental conditions from which a vehicle status can be determined. For example, imagery depicting steam or smoke in vicinity of the vehicle may be indicative of a compromised condition.

Response system 308 is configured to determine one or more control actions to be performed by or initiated at vehicle 104 in response to a status determined by AV status determination system 306. For example, if the status of the vehicle is determined to match one or more predetermined statuses, response system 308 may initiate one or more control actions corresponding to the one or more predetermined statuses. Response system 308 may generate one or more control messages transmitting information such as instructions to initiate the one or more control actions. The one or more control messages can be transmitted from the remote computing system 150 to the vehicle 104 to initiate one or more control actions. By way of particular example, a fully operational status, a semi-operational status, and a non-operational status may be used in one implementation. If the status of the vehicle is determined to be fully operational, response system 308 may determine that no control action is necessary. Accordingly, no control message may be generated or transmitted in such a situation. If the status of the vehicle is semi-operational, response system 308 may determine that the vehicle 104 should proceed to a maintenance location. Accordingly, the response system 308 may generate one or more control messages instructing the vehicle 104 to generate a motion plan towards the predetermined maintenance or other location. It is the status of the vehicle is determined to be nonoperational, response system 308 may determine that the vehicle should execute a controlled stop toward a destination representing a safe state. Accordingly, the response system 308 may generate one or more control messages instructing the vehicle 104 to generate a motion plan that executes the controlled stop.

Figure 5:
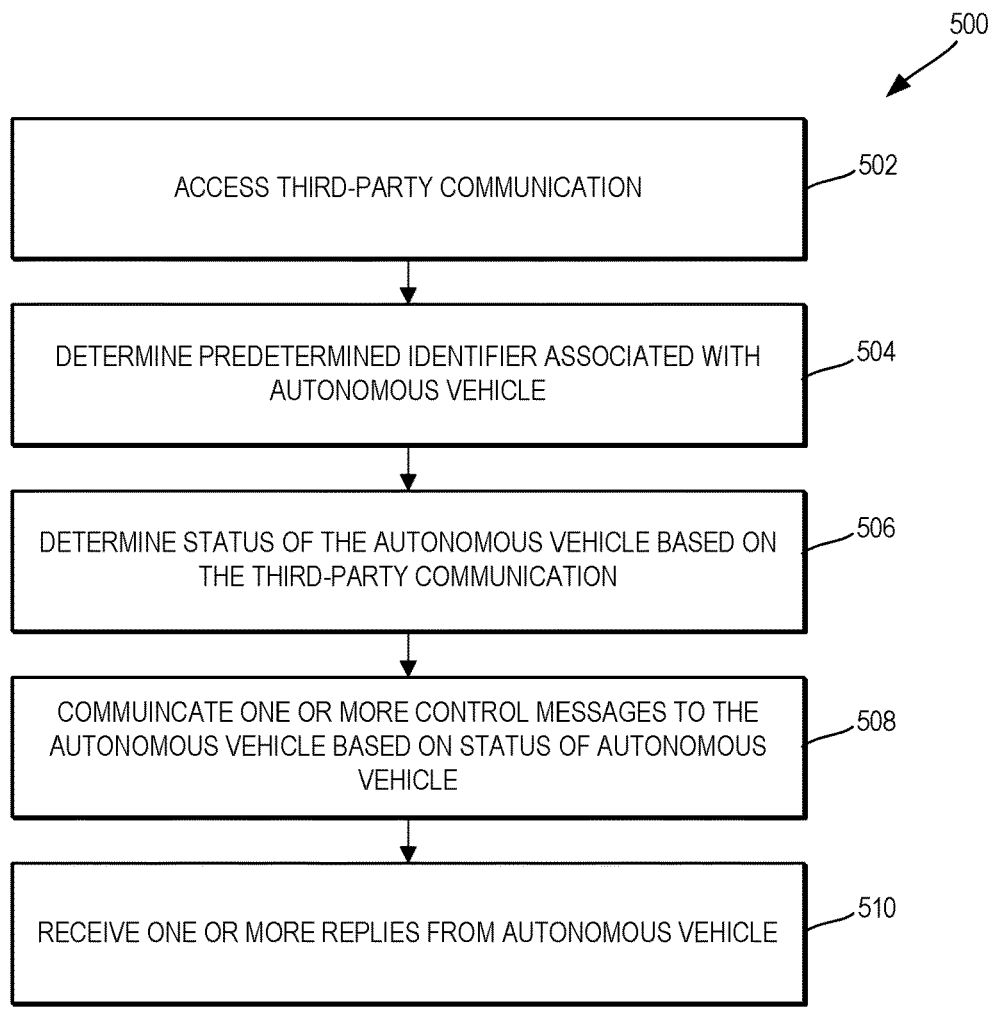
FIG. 5 depicts a flowchart diagram of an example process of determining a status associated with an autonomous vehicle based on a third-party communication according to example embodiments of the present disclosure.

FIG. 5 is a flowchart diagram depicting an example process 500 for accessing third-party communications associated with an autonomous vehicle and generating one or more control messages in response, according to example embodiments of the disclosed technology. One or more portions of process 500 (and other processes described herein) can be implemented by one or more computing devices such as, for example, one or more computing devices of remote computing system 150 of FIG. 1, or example computing system 1002 of FIG. 10. Moreover, one or more portions of process 500 can be implemented as an algorithm on the hardware components of the devices described herein (e.g., as in FIGS. 1, 2, 3, 4, and 10) to, for example, access a third-party communication associated with an autonomous vehicle 104 and to determine one or more control actions in response. In example embodiments, process 500 may be performed by an AV status computing system 132 implemented using one or more computing devices of a remote computing system 150.

At 502, a computing system, such as a remote computing system associated with operations of an autonomous vehicle, accesses a third-party communication associated with the autonomous vehicle. In some examples, the third-party communication may be received directly from a user computing system. In other examples, the remote computing system may access a third-party communication provided by third-party computing system.

At 504, the computing system determines a predetermined identifier associated with the autonomous vehicle. In some examples, the remote computing system can extract the predetermined identifier from the third-party communication. For example, the third-party communication may include text including the predetermined identifier. In another example, the third-party communication may include imagery from which the predetermined identifier is determined. In yet other examples, the remote computing system can perform an analysis based on the third-party communication and additional data to determine the predetermined identifier. For instance, the remote computing system can determine a time and/or location associated with third-party communication. The computing system can also access movement or other records associated with autonomous vehicles of a service entity. The remote computing system can perform a correlation to determine any of the autonomous vehicles of the service entity that may have been at the location at the time indicated in the third-party communication. If the movement records of any of the autonomous vehicles have a time and/or location matching that of the third-party communication, the remote computing system can identify the predetermined identifier of the vehicle from the movement records as that of a vehicle corresponding to the third-party communication.

At 506, the computing system determines the status of the autonomous vehicle based at least in part on the third-party communication. In some examples, the remote computing system may determine a status associated with the autonomous vehicle directly from information included in a third-party communication. For example, a user may enter status or condition information associated with an autonomous vehicle into a text message, voice message, or other electronic message transmitted to the remote computing system. In another example, a user may select a predetermined status or condition of an autonomous vehicle using a software application on a user computing device that is associated with the remote computing system 150. Using the software application, the user may transmit a third-party communication to the remote computing system. The remote computing system may utilize image analysis to determine the status associated with a vehicle in some examples. In some implementations, one or more machine-learned models may be utilized to determine the status of the autonomous vehicle based on the third-party communication at 506. For example, text or other data from a third-party communication may be provided as input to a machine-learned model trained to generate as output a status of the autonomous vehicle based on text or other input data. As described in more detail hereinafter, the remote computing system may access sensor data associated with the vehicle determine the status the vehicle at 506 in some examples.

At 508, the computing system communicates one or more control messages to the autonomous vehicle based on the status of the vehicle determined at 506. By way of example, if the remote computing system determines an autonomous vehicle should not be operated, a control message may be transmitted instructing the vehicle to initiate a controlled stop in a safe state. The one or more control messages may initiate or include instructions causing one or more control actions at the autonomous vehicle.

At 510, the computing system optionally receives one or more replies from the autonomous vehicle. For example, the vehicle computing system 102 may respond to a control message by transmitting sensor data from the vehicle to the remote computing system. In another example, the vehicle computing system may respond to a control message by issuing a confirmation reply. Any number and type of communications may be exchanged between the remote computing system and vehicle computing system at 508 and 510.

Figure 6:
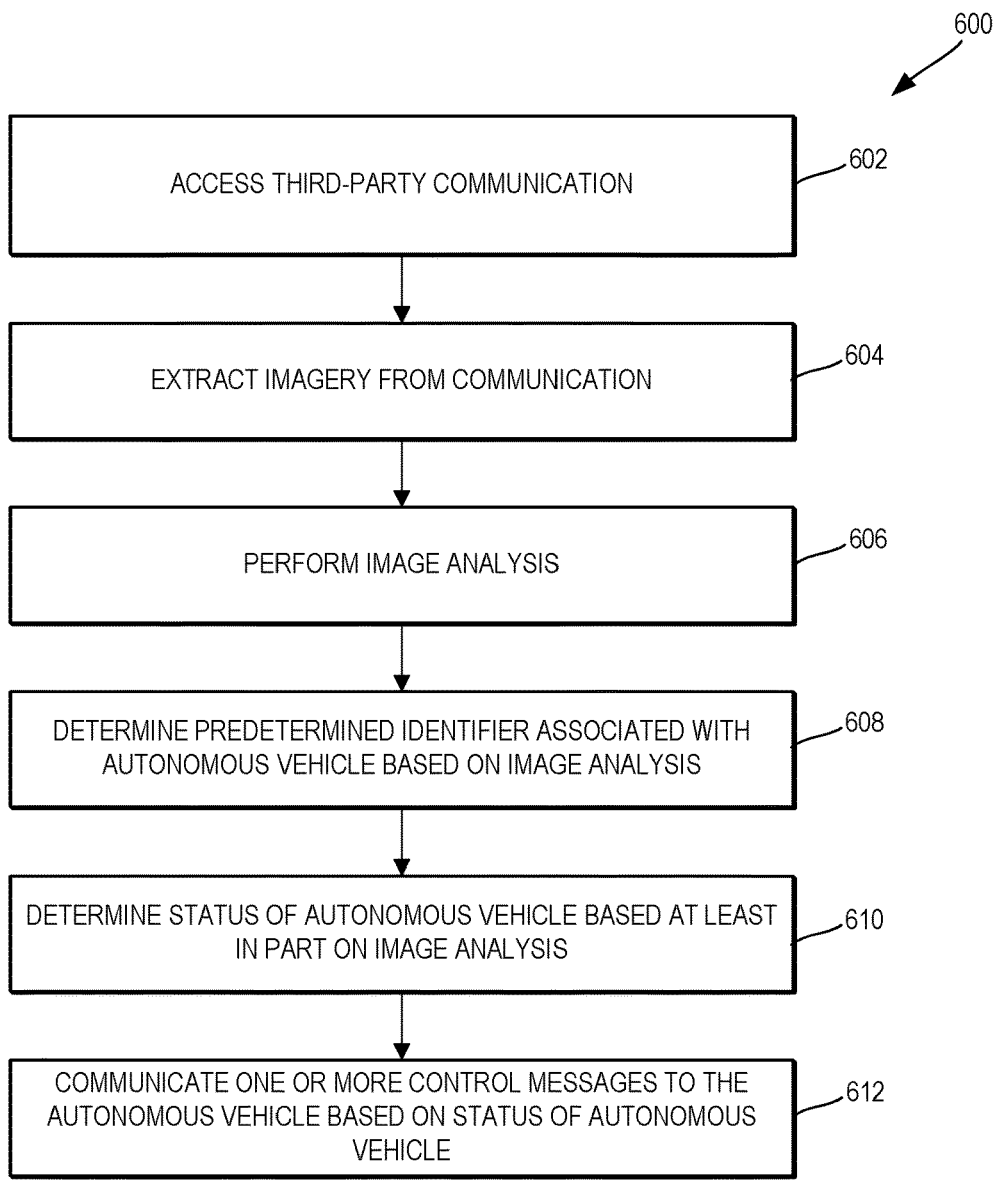
FIG. 6 depicts a flowchart diagram of an example process of remotely determining a status associated with an autonomous vehicle based on third-party imagery according to example embodiments of the present disclosure.

FIG. 6 is a flowchart diagram depicting an example process 600 for generating one or more control messages for an autonomous vehicle based on image processing in association with a third-party communication in accordance with example embodiments of the disclosed technology. In example embodiments, process 500 may be performed by an AV status computing system 132 implemented using one or more computing devices of a remote computing system 150.

At 602, a computing system, such as a remote computing system 150, accesses a third-party communication associated with the autonomous vehicle. The third-party communication may be received from a user computing system or accessed at a third-party computing system as earlier described.

At 604, the computing system extracts imagery from the third-party communication. The imagery may include an image or video depicting at least a portion of the vehicle. The imagery may be transmitted from a user computing system to a remote computing system in some examples, or may be accessed at a third-party computing system by the remote computing system.

At 606, the computing system performs an image analysis on the extracted imagery. The image analysis may include any number and variety of image processing techniques.

At 608, the computing system determines a predetermined identifier associated with the autonomous vehicle based on the image analysis at 606. For example, the remote computing system may perform an image analysis on the image to identify one or more predetermined identifiers in association with an autonomous vehicle depicted in the imagery. The computing system can perform image recognition, for example, to identify from an image one or more predetermined identifiers. In some implementations, one more machine-learned models may be used at 606 and 608 to identify from imagery a predetermined identifier associated with the autonomous vehicle. By way of example, imagery from a third-party communication may be provided as input to a machine-learned model trained to generate as output a predetermined identifier of the autonomous vehicle based on the imagery.

At 610, the computing system determines a status of the autonomous vehicle based at least in part on the image analysis. The remote computing system may utilize image processing to determine the status associated with a vehicle based on imagery included in a third-party communication. The computing system can perform image recognition or classification, for example, to identify a condition of the vehicle from an image. For example, the remote computing system can analyze imagery to determine a condition of an external surface of the autonomous vehicle and/or an environment external to the autonomous vehicle depicted in the imagery to determine the status of the autonomous vehicle. In some implementations, one more machine-learned models may be used at 606 and 610 to determine from imagery of a third-party communication a condition or status associated with the autonomous vehicle. By way of example, imagery from a third-party communication may be provided as input to a machine-learned model trained to generate as an output a status of the autonomous vehicle based on the imagery.

At 612, the computing system communicates one or more control messages to the autonomous vehicle based on the status of the vehicle determined at 610.

Figure 7:
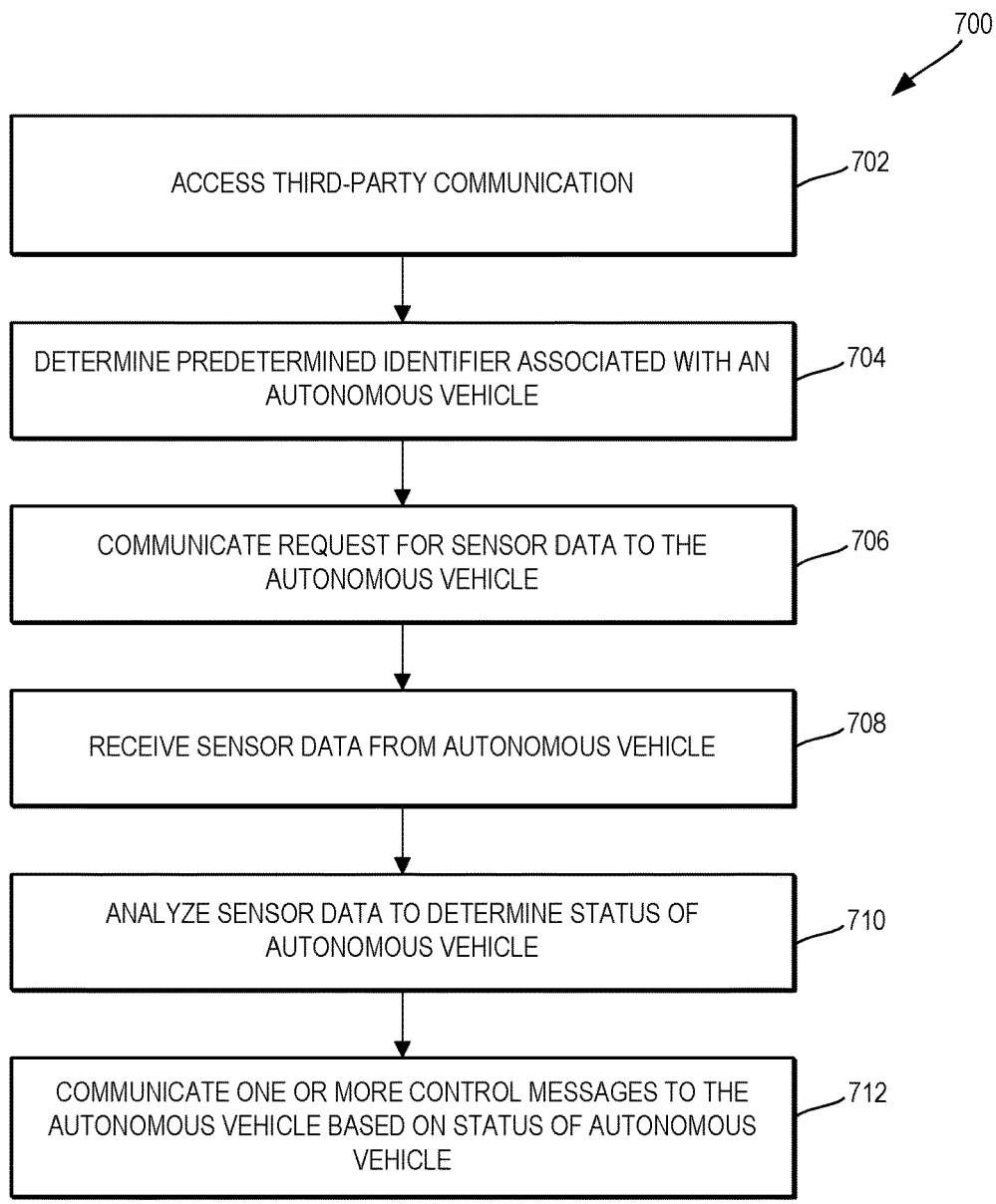
FIG. 7 depicts a flowchart diagram of an example process of determining a status associated with an autonomous vehicle based on sensor data of an autonomous vehicle according to example embodiments of the present disclosure.

FIG. 7 is a flowchart diagram depicting an example process 700 for generating one or more control messages based on sensor data accessed in response to a third-party communication in accordance with example embodiments of the disclosed technology. In example embodiments, process 700 may be performed by an AV status computing system 132 implemented using one or more computing devices of remote computing systems 150.

At 702, a computing system, such as a remote computing system 150, accesses a third-party communication associated with the autonomous vehicle. The third-party communication may be received from a user computing system or accessed at a third-party computing system as earlier described.

At 704, the computing system determines a predetermined identifier associated with an autonomous vehicle based at least in part on the third-party communication. The predetermined identifier may be determined using various techniques as described herein, including image analysis, textual analysis, and/or one or more machine-learned models.

At 706, the remote computing system communicates one more requests for sensor data to the autonomous vehicle associated with the predetermined identifier from 704. In some examples, the remote computing system may transmit one or more control messages including a request for sensor data from the autonomous vehicle at 706. The request may be for all or a portion of sensor data available to the vehicle computing system of vehicle 104. In some implementations, the remote computing system may request sensor data associated with a time based on the third-party communication.

At 708, the remote computing system receives sensor data from the autonomous vehicle in response to the one or more requests communicated at 706. The sensor data may be from a sensor system configured to generate sensor data relative to the autonomous vehicle. In some implementations, the sensor data is received from a sensor positioned on or in the autonomous vehicle. In some implementations, the sensor data is received from a sensor positioned relative to the autonomous vehicle. In some embodiments, the sensor data is LIDAR data from one or more LIDAR sensors positioned on or in the autonomous vehicle, RADAR data from one or more RADAR sensors positioned on or in the autonomous vehicle, or image data such as visible spectrum imagery from one or more image sensors (e.g., cameras) positioned on or in the autonomous vehicle. The autonomous vehicle may optionally include a plurality of additional sensors such as inertial measurement unit (IMU) sensors, pressure sensors, contact strip sensors, suspension travel sensors, laser sensors, sound sensors, and/or any other suitable sensor to determine information about the autonomous vehicle or its surrounding environment. The sensor data may be used to generate detections, classifications, and/or predictions by one or more machine-learned models or other systems of the vehicle computing system. The sensor data may be obtained from the remote access system 120 of vehicle computing system 102 in some examples.

At 710, the remote computing system analyzes the sensor data to determine the status of the autonomous vehicle. By way of example, the sensor data may include image data or other sensor data from which a condition of the autonomous vehicle can be assessed. The sensor data may be used in combination with information from a third-party communication to determine the status of the autonomous vehicle at 710. In some examples, a plurality of predetermined statuses may be used. Each predetermined status may be associated with a set of one or more sensor data values. The remote computing system may determine the status of the vehicle based on the predetermined status that is most closely associated with the sensor data received from the vehicle. In some examples, the human operator may utilize the remote computing system at 710 to analyze the sensor data and determine the status of the autonomous vehicle. However, in other examples, the remote computing system determines a status for the autonomous vehicle automatically in response to the sensor data and/or information associated with a party communication.

At 712, the computing system communicates one or more control messages to the autonomous vehicle based on the status of the vehicle determined at 710.

Figure 8:
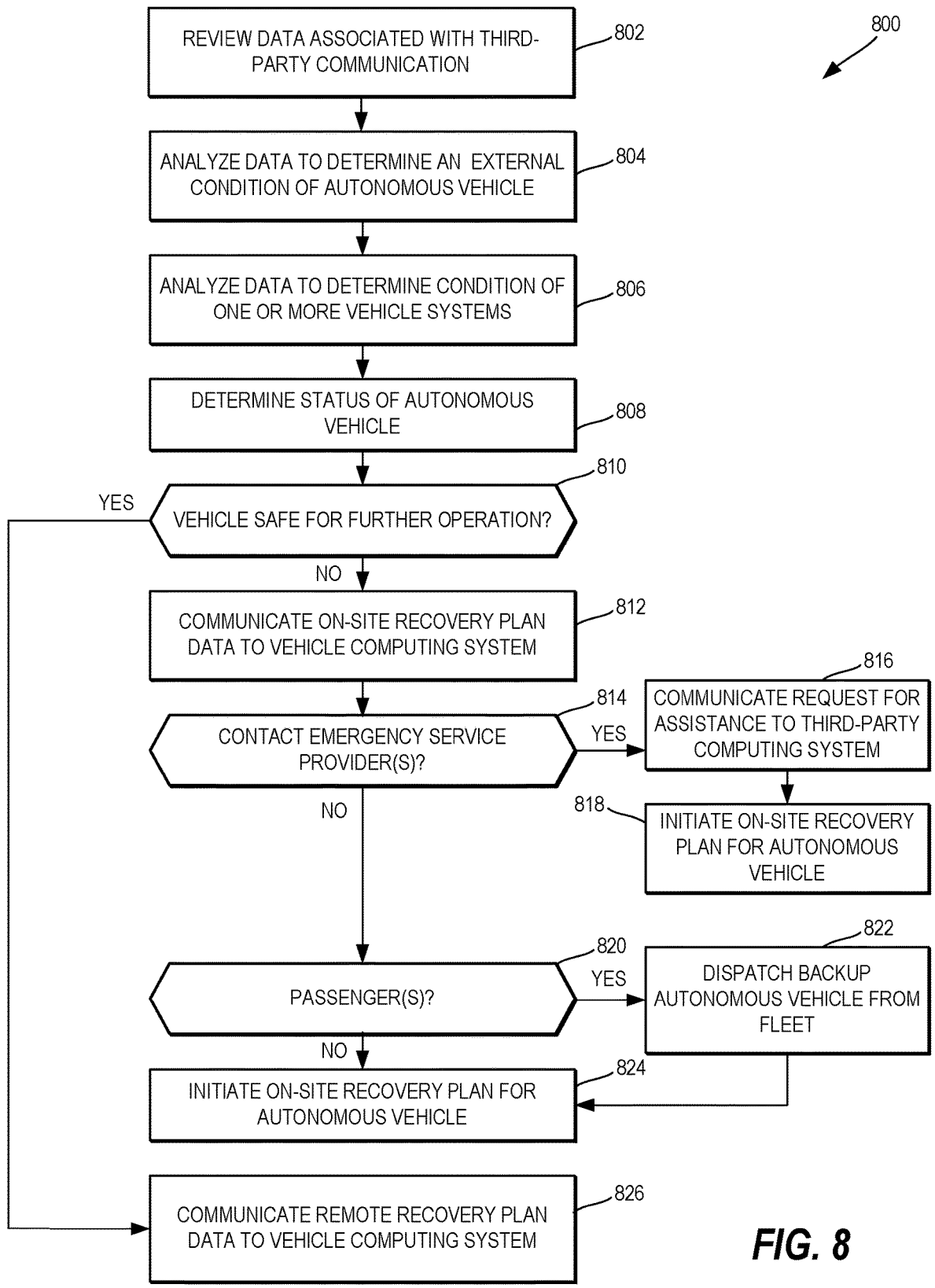
FIG. 8 depicts a flowchart diagram of an example process of generating at a remote computing system a recovery plan for an autonomous vehicle according to example embodiments of the present disclosure.

FIG. 8 is a flowchart diagram depicting an example process 800 of analyzing data associated with a third-party communication in order to determine one or more control actions to initiate and/or perform in association with an autonomous vehicle. In example embodiments, process 800 may be performed by an AV status computing system 132 implemented using one or more computing devices of a remote computing system 150. In some implementations, process 800 may be performed automatically by one or more computing devices. In other implementations, one or more portions of process 800 may be performed by a user interfacing with one or more computing devices.

At 802, data associated with the third-party communication can be reviewed. In some examples, information included in the third-party communication such as image data, textual data, and other data may be reviewed. Additionally and/or alternatively, sensor data such as video data or image data received from the autonomous vehicle and associated with a time of the third-party communication can be reviewed. For example, sensor data for a predetermined amount of time before and/or after the time of the third-party communication can be reviewed at 802. In some examples, automated processes including machine learning, image processing, and/or other techniques may be used at 802. In some examples, a user may review sensor data at 802.

At 804, the data can be analyzed to determine an external condition of the autonomous vehicle, such as a condition of one or more external surfaces of the autonomous vehicle. For example, imagery or other information included in the third-party communication may be analyzed to determine the external condition of the autonomous vehicle. In another example, sensor data such as image or other data depicting an external surface of the vehicle may be analyzed. In yet another example, both sensor data and data included in the third-party communication may be analyzed.

At 806, the data is analyzed to determine the condition of one or more vehicle systems of the autonomous vehicle. For example, sensor data may be analyzed to determine whether vehicle systems such as propulsion systems, control systems, and the like are functioning properly.

At 808, a status of the autonomous vehicle is determined based at least in part on the external condition of the autonomous vehicle and/or the condition of the one or more vehicle systems.

At 810, it is determined whether the vehicle is safe for further operation. For example, it may be determined whether the status of the autonomous vehicle indicates that the autonomous vehicle is safe to continue with autonomous operations.

If it is determined that the vehicle is safe to continue after analyzing the third-party communication data and/or sensor data, process 800 can continue at 826. At 826, remote recovery plan data can optionally be transmitted to the vehicle computing system of the autonomous vehicle. For example, if the autonomous vehicle was previously stopped in response to a third-party communication or sensor data, the remote recovery plan data can include instructions for the vehicle computing system to proceed with autonomous operations. In some examples, the remote recovery plan data may include instructions, data, or commands to reset any fault conditions associated with the autonomous vehicle. The remote recovery plan data may include information to be provided to a passenger or other person associated with a vehicle service being performed.

If it is determined that the autonomous vehicle is not safe for further operation, on-site recovery plan data can be transmitted to a vehicle computing system associated with the autonomous vehicle at 812. In some examples, the on-site recovery plan can be transmitted as one or more control messages to the vehicle computing system 102. The on-site recovery plan can include instructions for the autonomous vehicle to proceed to a controlled stop at a destination representing a safe state. The on-site recovery plan data may additionally include information or instructions for one or more service personnel that are to be dispatched to service the autonomous vehicle. The on-site recovery plan data may also include information relating to the analysis of the sensor data. In yet another example, the on-site recovery plan data may include instructions for further handling or transport of cargo associated with the autonomous vehicle. Other on-site recovery plan data may be transmitted.

At 814, it is determined whether to contact an emergency service provider based on the analysis of the third-party communication data and/or sensor data. For example, an operator or an automated process by the remote computing system may be used to determine whether the data indicates that an emergency service provider should be contacted. By way of example, if the sensor data satisfies one or more thresholds it may be determined that an emergency service provider should be contacted.

If it is determined that an emergency service provider should be contacted, process 800 continues at 816 where a request for assistance is transmitted to one or more third-party computing systems associated with an emergency service provider. In some examples, a vehicle assistance computing system or other remote computing system can automatically transmit a request to a third-party computing system associated with the emergency service provider. In another example, an operator may call or otherwise initiate communication with an emergency service provider at 816.

After transmitting the request for assistance to a third-party computing system, process 800 continues at 818 where an on-site recovery of the autonomous vehicle is initiated.

If it is determined that emergency services should not be contacted, process 800 continues at 820 where it is determined whether the autonomous vehicle is currently associated with one or more passengers. For example, the computing system may determine whether the autonomous vehicle was currently providing one or more vehicle services to one or more passengers. In another example, sensor data may be analyzed to determine whether the autonomous vehicle is providing a vehicle service to one or more passengers.

If it is determined that the autonomous vehicle is associated with one or more passengers, process 800 can continue at 822. At 822, one or more backup autonomous vehicles can be dispatched from a fleet in order to complete one or more vehicle services associated with the one or more passengers. In such cases, the computing system can transmit on-site recovery plan data including an indication that a backup autonomous vehicle is being sent to service the one or more passengers. The on-site recovery plan data can include an indication of the backup autonomous vehicle, such as a license plate number vehicle description, driver description, or other information associated with the backup autonomous vehicle.

If it is determined that the autonomous vehicle is not associated with one or more passengers at 820, or after dispatching a backup autonomous vehicle at 822, an on-site recovery plan for the autonomous vehicle can be initiated at 824.

The on-site recovery plan data may include information or instructions for one or more service personnel that are to be dispatched to service the autonomous vehicle. The on-site recovery plan data may also include information relating to the analysis of the sensor data. In yet another example, the on-site recovery plan data may include instructions for further handling or transport of cargo associated with the autonomous vehicle. Other on-site recovery plan data may be transmitted.

Figure 9:
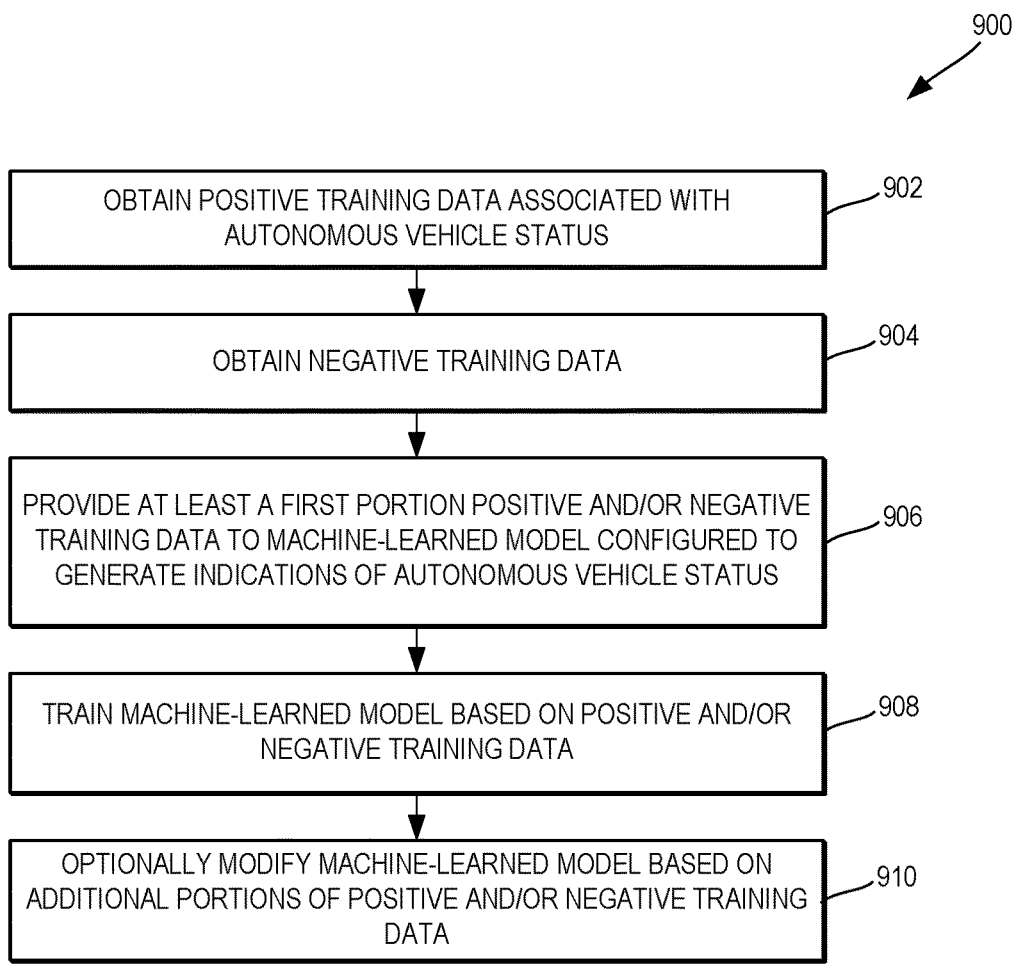
FIG. 9 depicts a flowchart diagram of an example process of training a machine-learned model to generate an indication of a status associated with an autonomous vehicle based on input image data.

FIG. 9 is a flowchart diagram depicting an example process 900 of training a machine-learned model to generate indications of an autonomous vehicle status based on input sensor data. One or more portions of process 900 can be implemented by one or more computing devices such as, for example, one or more computing devices of remote computing system(s) 150, or example computing systems 1002 or 1030 of FIG. 10. Moreover, one or more portions of the processes described herein can be implemented as an algorithm on the hardware components of the devices described herein (e.g., as in FIGS. 1, 2, 3, 4 and 10) to, for example, train a machine-learned model for determining a vehicle status based on sensor data associated with an autonomous vehicle. In example embodiments, process 900 may be performed by a model trainer 1060 of a machine learning computing system 1030 as described hereinafter. In some implementations, process 900 may be performed automatically by one or more computing devices. In other implementations, one or more portions of process 900 may be performed by a user interfacing with one or more computing devices.

At 902, the computing system obtains a positive training dataset for training a machine-learned model for determining a status associated with the vehicle. The positive training dataset for a particular status can include image data, sensor data, or other vehicle state data associated with such a status. The positive training dataset can include labeled data associated with one more vehicle statuses. In some examples, a predetermined number of vehicle statuses are established prior to training the model. In some implementations, image data can be included in the positive training dataset, such as an image of an autonomous vehicle associated with a particular vehicle status. The image data may include one or more labels or other annotations indicating that the image data is associated with a particular status. The labels may be hand generated or automatically generated by one or more computing systems. The labeled image data may indicate that the image data is part of a positive training dataset for training a machine-learned model to determine the vehicle status. By way of example, the labeled image data in the positive training dataset may be used for reinforcement learning. The image data may be from one or more sensors. The sensors may be of a single type or of multiple different types. The sensor data may be obtained over a time period associated with a vehicle status. Although image data has been described with respect to training a machine-learned model, a machine-learned model may be trained based on sensor data or other data in order to determine a vehicle status.

At 904, the computing system optionally obtains a negative training dataset for training the machine-learned model to determine the status decision of the vehicle. The negative training dataset can include image data or other sensor data that is not associated with a particular status the model is being trained to detect. The negative training dataset can include labeled image data not associated with a particular status the model is being trained to determine. In some instances, the labeled image data may be associated with one or more potential false positives. For instance, the labeled sensor data may be associated with one or more appearances that could be falsely attributed to a particular vehicle status. The labels may be hand generated or automatically generated by one or more computing systems. The labeled sensor data may indicate that the image or other sensor data is part of a negative training dataset in order to be used for training a machine-learned model not to associate such data with a particular vehicle status. The data may be from one or more sensors. The sensors may be of a single type or multiple different types. The sensor data may be obtained over one or more time periods associated with a different vehicle status than that for which the machine-learned model is being trained.

At 906, at least a first portion of the positive training dataset and/or at least a first portion of the negative training dataset are provided to the machine-learned model for determining a vehicle status based on input sensor data. In some examples, such as where only a positive training dataset is used, only positive training data is provided at 906.

At 908, the machine-learned model is trained based on labeled sensor data of the positive training dataset and/or the negative training dataset. Various techniques may be used at 908 in order to train the machine-learned model. For example, positive reinforcement learning and/or negative reinforcement learning may be used. In some examples, back propagation using a sub gradient may be used in order to train the machine-learned model.

At 910, the machine-learned model is optionally modified based on additional portions of the positive training dataset and/or negative training dataset. For example, a second portion of the positive training dataset and/or negative training dataset may be provided to the machine-learned model which can generate a vehicle status indication. Based on whether the status indication was correct or not, the machine-learned model can be further trained by back propagation of errors or other techniques.

Although FIG. 9 describes a process of training machine-learned model to determine a vehicle status based on image data, a similar process may be used to training machine-learned model to determine a predetermined identifier associated with the vehicle based on image or other data.

Figure 10:
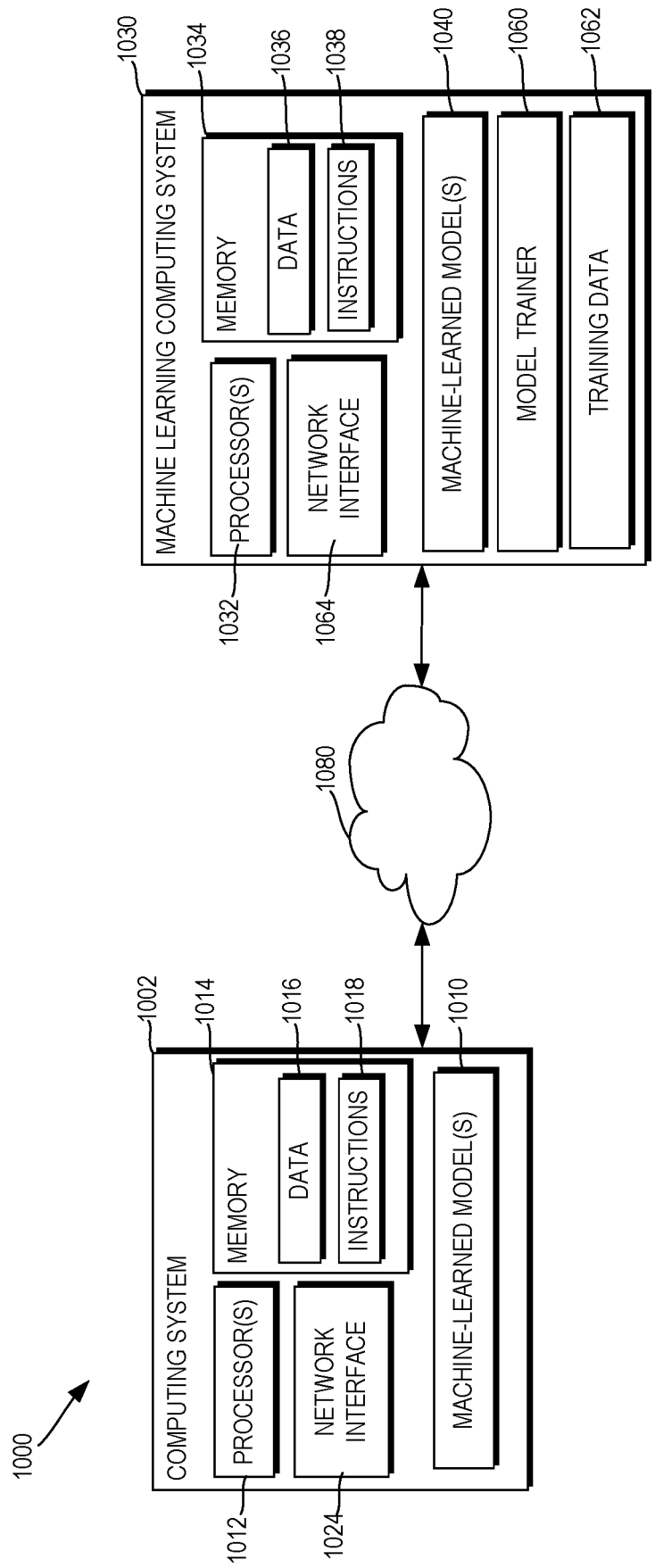
FIG. 10 depicts a block diagram of an example computing system according to example embodiments of the present disclosure.

FIG. 10 depicts a block diagram of an example computing system 1000 according to example embodiments of the present disclosure. The example computing system 1000 includes a computing system 1002 and a machine learning computing system 1030 that are communicatively coupled over a network 1080.

In some implementations, the computing system 1002 can determine a predetermined identifier associated with the third-party communication and/or discriminate vehicle status based at least in part on a party communication. In some implementations, the computing system 1002 can perform test determinations using were more machine-learned models. In some implementations, the computing system 1002 is included in one or more remote computing systems 150. For example, the computing system 1002 can operate offline to obtain sensor data and perform vehicle status determinations. In other implementations, the computing system 1002 can be included in an autonomous vehicle. For example, the computing system 1002 can be on-board the autonomous vehicle. In some embodiments, computing system 1002 can be used to implement vehicle computing system 102. The computing system 1002 can include one or more distinct physical computing devices.

The computing system 1002 includes one or more processors 1012 and a memory 1014. The one or more processors 1012 can be any suitable processing device (e.g., a processor core, a microprocessor, an ASIC, a FPGA, a controller, a microcontroller, etc.) and can be one processor or a plurality of processors that are operatively connected. The memory 1014 can include one or more non-transitory computer-readable storage media, such as RAM, ROM, EEPROM, EPROM, one or more memory devices, flash memory devices, etc., and combinations thereof.

The memory 1014 can store information that can be accessed by the one or more processors 1012. For instance, the memory 1014 (e.g., one or more non-transitory computer-readable storage mediums, memory devices) can store data 1016 that can be obtained, received, accessed, written, manipulated, created, and/or stored. The data 1016 can include, for instance, image or other sensor data captured by one or more sensors, machine-learned models, etc. as described herein. In some implementations, the computing system 1002 can obtain data from one or more memory device(s) that are remote from the computing system 1002.

The memory 1014 can also store computer-readable instructions 1018 that can be executed by the one or more processors 1012. The instructions 1018 can be software written in any suitable programming language or can be implemented in hardware. Additionally, or alternatively, the instructions 1018 can be executed in logically and/or virtually separate threads on processor(s) 1012.

For example, the memory 1014 can store instructions 1018 that when executed by the one or more processors 1012 cause the one or more processors 1012 to perform any of the operations and/or functions described herein, including, for example, generating machine-learned models, generating predetermined identifiers associated with the vehicle, generating a vehicle status based on sensor data, etc.

According to an aspect of the present disclosure, the computing system 1002 can store or include one or more machine-learned models 1010. As examples, the machine-learned models 1010 can be or can otherwise include various machine-learned models such as, for example, neural networks (e.g., deep neural networks or other types of models including linear models and/or non-linear models. Example neural networks include feed-forward neural networks, recurrent neural networks (e.g., long short-term memory recurrent neural networks), convolutional neural networks, or other forms of neural networks.

In some implementations, the computing system 1002 can receive the one or more machine-learned models 1010 from the machine learning computing system 1030 over network 1080 and can store the one or more machine-learned models 1010 in the memory 1014. The computing system 1002 can then use or otherwise implement the one or more machine-learned models 1010 (e.g., by processor(s) 1012). In particular, the computing system 1002 can implement the machine-learned model(s) 1010 to determine a predetermined identifier associated with the autonomous vehicle from third-party communications and/or to determine a vehicle status based on third-party communications and/or sensor data.

The machine learning computing system 1030 includes one or more processors 1032 and a memory 1034. The one or more processors 1032 can be any suitable processing device (e.g., a processor core, a microprocessor, an ASIC, a FPGA, a controller, a microcontroller, etc.) and can be one processor or a plurality of processors that are operatively connected. The memory 1034 can include one or more non-transitory computer-readable storage media, such as RAM, ROM, EEPROM, EPROM, one or more memory devices, flash memory devices, etc., and combinations thereof. In some embodiments, machine learning computing system 1030 can be used to implement remote computing system 150 and/or vehicle computing system monitored.

The memory 1034 can store information that can be accessed by the one or more processors 1032. For instance, the memory 1034 (e.g., one or more non-transitory computer-readable storage mediums, memory devices) can store data 1036 that can be obtained, received, accessed, written, manipulated, created, and/or stored. The data 1036 can include, for instance, machine-learned models and flow graphs as described herein. In some implementations, the machine learning computing system 1030 can obtain data from one or more memory device(s) that are remote from the machine learning computing system 1030.

The memory 1034 can also store computer-readable instructions 1038 that can be executed by the one or more processors 1032. The instructions 1038 can be software written in any suitable programming language or can be implemented in hardware. Additionally, or alternatively, the instructions 1038 can be executed in logically and/or virtually separate threads on processor(s) 1032.

For example, the memory 1034 can store instructions 1038 that when executed by the one or more processors 1032 cause the one or more processors 1032 to perform any of the operations and/or functions described herein, including, for example, determining a predetermined identifier associated with third-party communication and/or determining a vehicle status associated with the third-party communication.

In some implementations, the machine learning computing system 1030 includes one or more server computing devices. If the machine learning computing system 1030 includes multiple server computing devices, such server computing devices can operate according to various computing architectures, including, for example, sequential computing architectures, parallel computing architectures, or some combination thereof.

In addition or alternatively to the machine-learned model(s) 1010 at the computing system 1002, the machine learning computing system 1030 can include one or more machine-learned models 1040. As examples, the machine-learned models 1040 can be or can otherwise include various machine-learned models such as, for example, neural networks (e.g., deep neural networks) or other types of models including linear models and/or non-linear models. Example neural networks include feed-forward neural networks, recurrent neural networks (e.g., long short-term memory recurrent neural networks), convolutional neural networks, or other forms of neural networks.

As an example, the machine learning computing system 1030 can communicate with the computing system 1002 according to a client-server relationship. For example, the machine learning computing system 1030 can implement the machine-learned models 1040 to provide a web service to the computing system 1002. For example, the web service can provide indications of a predetermined identifier and/or vehicle status in response to sensor data received from an autonomous vehicle.

Thus, machine-learned models 1010 can located and used at the computing system 1002 and/or machine-learned models 1040 can be located and used at the machine learning computing system 1030.

In some implementations, the machine learning computing system 1030 and/or the computing system 1002 can train the machine-learned models 1010 and/or 1040 through use of a model trainer 1060. The model trainer 1060 can train the machine-learned models 1010 and/or 1040 using one or more training or learning algorithms. One example training technique is backwards propagation of errors. In some implementations, the model trainer 1060 can perform supervised training techniques using a set of labeled training data. In other implementations, the model trainer 1060 can perform unsupervised training techniques using a set of unlabeled training data. The model trainer 1060 can perform a number of generalization techniques to improve the generalization capability of the models being trained. Generalization techniques include weight decays, dropouts, or other techniques.

In particular, the model trainer 1060 can train a machine-learned model 1010 and/or 1040 based on a set of training data 1062. The training data 1062 can include, for example, ground truth data including annotations for sensor data portions and/or vehicle state data. The model trainer 1060 can be implemented in hardware, firmware, and/or software controlling one or more processors.

In some examples, the model trainer 160 can train a machine-learned model 1010 and/or 1040 configured to generate indications of a predetermined identifier and/or vehicle status based on sensor data and/or vehicle state data associated with an autonomous vehicle. In some examples, the machine-learned model 1010 and/or 1040 is trained using sensor data that has been labeled or otherwise annotated as having a correspondence to a particular vehicle status or predetermined identifier for which the model is being trained to detect. By way of example, sensor data collected in association with a particular vehicle status can be labeled to indicate that it corresponds to a particular vehicle status. In some instances, the label may be a simple annotation that the sensor data corresponds to a positive training dataset. In some examples, the machine-learned model 1010 and/or 1040 is additionally or alternatively trained using sensor data that has been labeled or otherwise annotated as not having a correspondence to a particular vehicle status. By way of example, sensor data collected in association with potential false positives can be labeled to indicate that it corresponds to a potential false positive. In some instances, the label may be a simple annotation that the sensor data corresponds to a negative training dataset. In some examples, a loss function based on error in classifying sensor data as corresponding to a the vehicle status can be backpropagated to train one or more machine-learned models.

The computing system 1002 can also include a network interface 1024 used to communicate with one or more systems or devices, including systems or devices that are remotely located from the computing system 1002. The network interface 1024 can include any circuits, components, software, etc. for communicating with one or more networks (e.g., 1080). In some implementations, the network interface 1024 can include, for example, one or more of a communications controller, receiver, transceiver, transmitter, port, conductors, software and/or hardware for communicating data. Similarly, the machine learning computing system 1030 can include a network interface 1064.

The network(s) 1080 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 1080 can be accomplished, for instance, via a network interface using any type of protocol, protection scheme, encoding, format, packaging, etc.

FIG. 10 illustrates one example computing system 1000 that can be used to implement the present disclosure. Other computing systems can be used as well. For example, in some implementations, the computing system 1002 can include the model trainer 1060 and the training data 1062. In such implementations, the machine-learned models 1010 can be both trained and used locally at the computing system 1002. As another example, in some implementations, the computing system 1002 is not connected to other computing systems.

In addition, components illustrated and/or discussed as being included in one of the computing systems 1002 or 1030 can instead be included in another of the computing systems 1002 or 1030. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system, comprising:
   one or more processors; and
   one or more non-transitory computer-readable media that store instructions that, when executed by the one or more processors, cause the computing system to perform operations, the operations comprising:
      accessing a third-party communication associated with an autonomous vehicle;
      determining a predetermined identifier of the autonomous vehicle;
      inputting imagery data from the third-party communication to a machine-learned model trained to analyze the imagery data to identify a condition of an external surface of the autonomous vehicle and to generate as an output a status associated with the condition of the external surface of the autonomous vehicle based on the imagery data, wherein the machine-learned model is located remotely from the autonomous vehicle;
      receiving an indication of the status associated with the condition of the external surface of the autonomous vehicle from the machine-learned model; and
      transmitting one or more control messages to the autonomous vehicle based at least in part on the predetermined identifier and the status associated with the condition of the external surface of the autonomous vehicle.

2. The computing system of claim 1, wherein:
   the third-party communication includes imagery depicting at least a portion of the autonomous vehicle, the imagery having been captured at a client computing device by a user of the client computing device; and determining the predetermined identifier includes detecting the predetermined identifier based at least in part on an analysis of the imagery.

3. The computing system of claim 2, wherein:

determining the status associated with the autonomous vehicle is based at least part on the analysis of the imagery.

4. The computing system of claim 1, wherein:

the status associated with the autonomous vehicle includes a condition of the autonomous vehicle.

5. The computing system of claim 1, wherein accessing the third-party communication comprises:

receiving, from a remote client device, the third-party communication.

6. The computing system of claim 5, wherein the third-party communication includes at least one of a short messaging service (SMS) message, an e-mail message, or a web-based message.

7. The computing system of claim 6, further comprising:

transmitting one or more reply messages to the remote client device based on the third-party communication.

8. The computing system of claim 1, wherein accessing the third-party communication comprises:

accessing one or more third-party computing systems that provide third-party content.

9. The computing system of claim 8, wherein the operations further comprise:

analyzing an image from the third-party content to detect the predetermined identifier.

10. The computing system of claim 1, wherein:

accessing the third-party communication includes receiving the third-party communication via an application provided by a service entity associated with the autonomous vehicle.

11. The computing system of claim 1, wherein:

the one or more control messages include instructions for the autonomous vehicle to execute a controlled stop in a safe state.

12. The computing system of claim 1, wherein:

the one or more control messages include instructions for the autonomous vehicle to proceed toward a predetermined location.

13. The computing system of claim 1, wherein:

the one or more control messages include instructions for the autonomous vehicle to transmit sensor data from the autonomous vehicle to the computing system.

14. The computing system of claim 1, wherein:

the predetermined identifier comprises a code provided on an external surface of the autonomous vehicle.

15. The computing system of claim 1, wherein the one or more control messages comprise instructions for the autonomous vehicle to initiate travel according to a backup motion plan.

16. One or more tangible, non-transitory computer-readable media storing computer-readable instructions that when executed by one or more processors cause the one or more processors to perform operations, the operations comprising:

accessing a third-party communication associated with an autonomous vehicle;

determining a predetermined identifier of the autonomous vehicle;

inputting imagery data from the third-party communication to a machine-learned model trained to analyze the imagery data to identify a condition of an external surface of the autonomous vehicle and to generate as an output a status associated with the condition of the external surface of the autonomous vehicle based on the imagery data, wherein the machine-learned model is located remotely from the autonomous vehicle;

receiving an indication of the status associated with the condition of the external surface of the autonomous vehicle from the machine-learned model; and transmitting one or more control messages to the autonomous vehicle based at least in part on the predetermined identifier and the status associated with the condition of the external surface of the autonomous vehicle.

17. A computer-implemented method, comprising:

accessing a third-party communication associated with an autonomous vehicle;

determining a predetermined identifier of the autonomous vehicle;

inputting imagery data from the third-party communication to a machine-learned model trained to analyze the imagery data to identify a condition of an external surface of the autonomous vehicle and to generate as an output a status associated with the condition of the external surface of the autonomous vehicle based on the imagery data, wherein the machine-learned model is located remotely from the autonomous vehicle;

receiving an indication of the status associated with the condition of the external surface of the autonomous vehicle from the machine-learned model; and transmitting one or more control messages to the autonomous vehicle based at least in part on the predetermined identifier and the status associated with the condition of the external surface of the autonomous vehicle.

18. The one or more tangible, non-transitory computer-readable media of claim 16, wherein:

the third-party communication includes imagery depicting at least a portion of the autonomous vehicle, the imagery having been captured at a client computing device by a user of the client computing device; and determining the predetermined identifier includes detecting the predetermined identifier based at least in part on an analysis of the imagery.

19. The computer-implemented method of claim 17, wherein:

the third-party communication includes imagery depicting at least a portion of the autonomous vehicle, the imagery having been captured at a client computing device by a user of the client computing device; and determining the predetermined identifier includes detecting the predetermined identifier based at least in part on an analysis of the imagery.

* * * * *